US010652165B2

(12) United States Patent
Dasher et al.

(10) Patent No.: US 10,652,165 B2
(45) Date of Patent: May 12, 2020

(54) MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE

(71) Applicant: Ericsson AB, Stockholm (SE)

(72) Inventors: Charles Hammett Dasher, Lawrenceville, GA (US); Chris Phillips, Hartwell, GA (US); Robert Hammond Forsman, Sugar Hill, GA (US); Jennifer Ann Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 220 days.

(21) Appl. No.: 15/488,978

(22) Filed: Apr. 17, 2017

(65) Prior Publication Data

US 2017/0324676 A1 Nov. 9, 2017

Related U.S. Application Data

(62) Division of application No. 14/246,880, filed on Apr. 7, 2014, now Pat. No. 9,628,405.

(51) Int. Cl.
*H04L 12/927* (2013.01)
*H04L 29/06* (2006.01)
(Continued)

(52) U.S. Cl.
CPC ............ *H04L 47/801* (2013.01); *H04L 47/12* (2013.01); *H04L 65/4069* (2013.01);
(Continued)

(58) Field of Classification Search
CPC ... H04L 47/12; H04L 47/801; H04L 65/4069; H04N 21/23439; H04N 21/2402;
(Continued)

(56) References Cited

U.S. PATENT DOCUMENTS 9,306,994 B2 * 4/2016 Gahm ............... H04N 21/23805
2008/0101405 A1 * 5/2008 Wirick ............... H04N 21/2365
370/468

(Continued)

FOREIGN PATENT DOCUMENTS

EP 2573997 A1 * 3/2013 ......... H04L 65/4092
EP 2573997 A1 3/2013
(Continued)

OTHER PUBLICATIONS

Ali Begen, et al.: "Watching Video over the Web: Part 1: Streaming Protocols". vol. 15, No. 2. Mar. 1, 2011. XP011363531.
(Continued)

*Primary Examiner* — Michael C Lai

(57) ABSTRACT

A method of managing bandwidth allocation across a video pipe that delivers both streaming adaptive bitrate (ABR) content and progressive download ABR content includes receiving a designation of a congestion boundary within a video pipe, the congestion boundary designating a first percentage of the video pipe that is to be used for streaming ABR content when congestion exists on both sides of the congestion boundary, wherein a remaining percentage of the video pipe is to be used for progressive download ABR; allocating bandwidth for streaming ABR content, wherein the gateway device can allocate for streaming content only that portion of the remaining percentage of bandwidth that is not requested for progressive download content; and allocating bandwidth for progressive download content, wherein the gateway device can allocate for progressive download content only that portion of the first percentage of bandwidth that is not requested for streaming content.

7 Claims, 19 Drawing Sheets

(51) Int. Cl.
*H04L 12/801* (2013.01)
*H04N 21/2343* (2011.01)
*H04N 21/24* (2011.01)
*H04N 21/2662* (2011.01)
*H04N 21/442* (2011.01)
*H04N 21/61* (2011.01)
*H04N 21/845* (2011.01)

(52) U.S. Cl.
CPC ... *H04N 21/23439* (2013.01); *H04N 21/2402* (2013.01); *H04N 21/2662* (2013.01); *H04N 21/44209* (2013.01); *H04N 21/6125* (2013.01); *H04N 21/8456* (2013.01)

(58) Field of Classification Search
CPC ......... H04N 21/2662; H04N 21/44209; H04N 21/6125; H04N 21/8456
See application file for complete search history.

(56) References Cited

U.S. PATENT DOCUMENTS

| | | | |
|---|---|---|---|
| 2009/0122699 A1* | 5/2009 | Alperovitch | H04L 45/00 370/230 |
| 2009/0201946 A1 | 8/2009 | Killick et al. | |
| 2011/0296046 A1 | 12/2011 | Arya et al. | |
| 2013/0007263 A1 | 1/2013 | Soroushian et al. | |
| 2013/0311670 A1* | 11/2013 | Tarbox | H04N 21/2387 709/231 |
| 2013/0329556 A1* | 12/2013 | Vangala | H04L 47/29 370/235 |
| 2015/0039685 A1* | 2/2015 | Lewis | G06Q 30/02 709/204 |
| 2015/0249622 A1 | 9/2015 | Phillips et al. | |
| 2015/0249623 A1 | 9/2015 | Phillips et al. | |
| 2015/0256906 A1* | 9/2015 | Jones | H04L 65/4076 725/109 |

FOREIGN PATENT DOCUMENTS

| | | |
|---|---|---|
| WO | WO 2013/184326 A1 | 12/2013 |
| WO | WO 2013/184442 A1 | 12/2013 |
| WO | WO 2014/063726 A1 | 5/2014 |

OTHER PUBLICATIONS

Jangwoo Son: "Content Networking Trends—OTT, global CDN and Operator". Sep. 4, 2013, pp. 1-72.
Ulm, et al.: "Reclaiming control of the network from Adaptive Bit Rate Video Clients". May 21, 2012.
Akhshabi, et al.: "What happens when HTTP adaptive streaming players compete for bandwidth?" XP058020339. Jun. 7, 2012.
Lederer, et al.: "Adaptive Multimedia Streaming in Information-Centric Networks". IEEE Network. Nov./Dec. 2014.

* cited by examiner

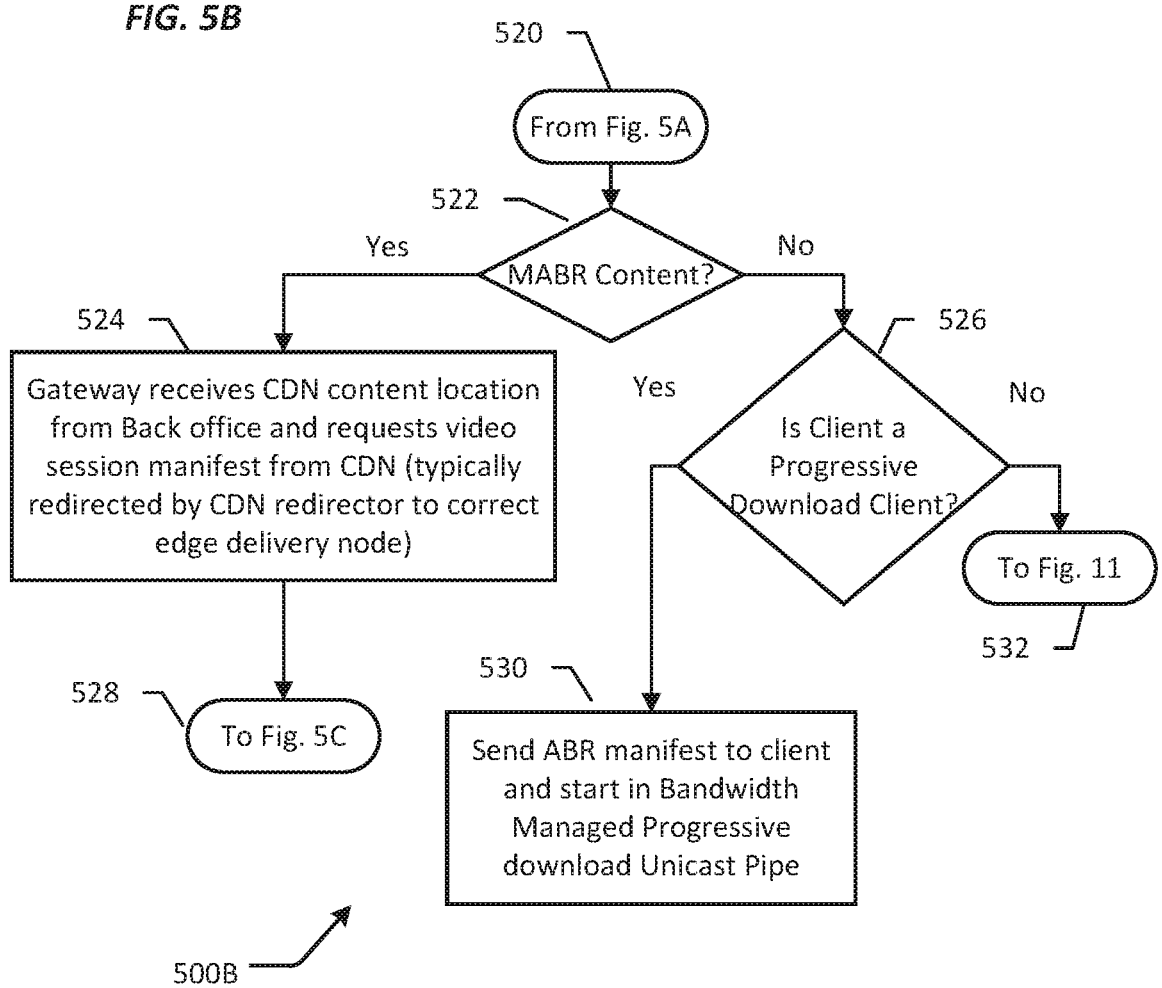

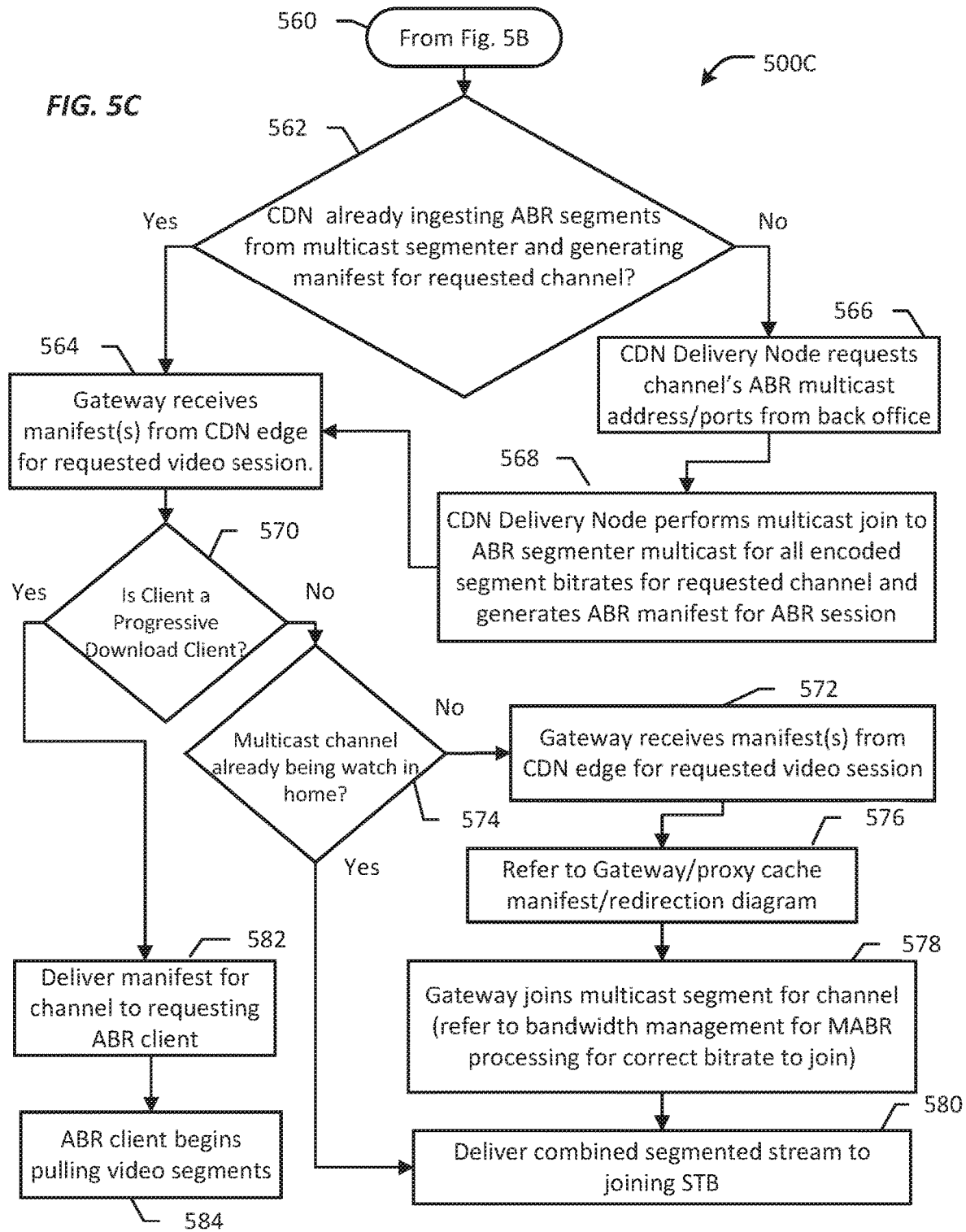

MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE

PRIORITY CLAIMS

This application is a divisional and claims priority to pending U.S. patent application Ser. No. 14/246,880, filed on Apr. 7, 2014, now U.S. Pat. No. 9,628,405, issued on Apr. 18, 2017. The contents of these documents are hereby incorporated by reference herein.

FIELD OF THE DISCLOSURE

This application discloses subject matter that is related to the subject matter of the following U.S. and PCT patent application(s): (i) "A METHOD AND APPARATUS FOR DISTRIBUTING A MEDIA CONTENT SERVICE", PCT Application No.: PCT/EP2012/070960, filed Oct. 23, 2012, in the name(s) of Anthony Richard Jones, (ii) "CONFLICT DETECTION AND RESOLUTION IN AN ABR NETWORK", application Ser. No. 14/194,868, filed Mar. 3, 2014, in the name(s) of Christopher Phillips et al., and (iii) "CONFLICT DETECTION AND RESOLUTION IN AN ABR NETWORK USING CLIENT INTERACTIVITY", application Ser. No. 14/194,918, filed Mar. 3, 2014, in the name(s) of Christopher Phillips et al., each of which is hereby incorporated by reference in its entirety. The subject matter of the present patent application is also related to the subject matter of the following U.S. patent application(s) filed even date herewith: (i) "UNICAST ABR STREAMING", application Ser. No. 14/246,920 in the name(s) of Christopher Phillips et al., which is hereby incorporated by reference in its entirety.

The present disclosure generally relates to providing adaptive bitrate (ABR) technology in multiple forms—multicast ABR (MABR), unicast ABR (UABR) and progressive download ABR in a customer premises device within the same video delivery pipe. More specifically, the disclosure relates to the following related concepts: a) balancing the needs of streaming clients against the needs of progressive download clients within a single premises video pipe; b) providing a mechanism for changing the bitrate of a streaming unicast client during the video session; c) managing bandwidth allocations for all streaming clients served by a premises video pipe and premises gateway device; and d) synchronizing the delivery of MABR segments and progressive download ABR segments from a single channel such that segments can be shared between streaming clients and progressive download clients that are watching the same channel at the same bitrate.

BACKGROUND

In the home, a consumer may use a plurality of devices to consume video; these devices can include set top boxes as well as progressive download clients. Set top boxes are designed to receive a constant stream of video, either by tuning to a broadcast or multicast channel or by requesting video-on-demand (VoD). These streaming clients may be in conflict with progressive download clients that are designed to receive the video in bursts. With the growing quality of video, including 4k video and the increases in demand for bandwidth, efficiency in video delivery is becoming increasingly important in order to allow a plurality of devices to consume video. When bandwidth limits are reached, clients must contend for limited bandwidth in order to consume video. This may at times have an adverse effect on the client's ability to receive adequate amounts of video in order to function.

SUMMARY

The present patent disclosure is broadly directed to methods and devices for providing adaptive bitrate video to client devices. In one aspect, an embodiment of a method, performed by a gateway device, of managing bandwidth allocation across a video pipe that delivers both streaming adaptive bitrate (ABR) content and progressive download ABR content is disclosed. The method comprises receiving a designation of a congestion boundary within a video pipe serving the premises associated with the gateway device, the congestion boundary designating a first percentage of the video pipe that is to be used for streaming ABR content when congestion exists on both sides of the congestion boundary, wherein a remaining percentage of the video pipe is to be used for progressive download ABR; allocating bandwidth for streaming ABR content, wherein the gateway device can allocate for streaming content only that portion of the remaining percentage of bandwidth that is not requested for progressive download content; and allocating bandwidth for progressive download content, wherein the gateway device can allocate for progressive download content only that portion of the first percentage of bandwidth that is not requested for streaming content.

In another aspect, an embodiment of a method of synchronizing multicast adaptive bitrate (MABR) delivery of a requested channel and progressive download adaptive bitrate (ABR) delivery of the requested channel from a premises gateway to user devices is disclosed. The method comprises responsive to determining that a requested video session is for MABR content on a requested channel, the premises gateway receiving a location of a content delivery network (CDN) from a back office and requesting a video session manifest for the requested channel from the CDN. If the client is a progressive download client, the method continues with delivering a copy of the video session manifest to the progressive download ABR client whereby the progressive download ABR client can begin pulling (584) video segments. If the client is not a progressive download client and if the requested channel is not already being watched at a premises served by the premises gateway, the method continues with the premises gateway receiving the video session manifest for the requested channel and joining an MABR multicast for the requested channel, wherein the video session manifest and the MABR multicast both access content from a single multicast segmenter. If the client is not a progressive download client, the method delivers a combined segmented stream from the MABR multicast for the requested channel to the client.

In a further aspect, an embodiment of a method of synchronizing multicast adaptive bitrate (MABR) and progressive download adaptive bitrate (ABR) of a requested channel for delivery to a client gateway is disclosed. The method comprises on receiving a request for a video session manifest for the requested channel from the gateway device, determining at a content delivery node whether the content delivery node is currently ingesting ABR segments from a multicast segmenter for the channel. If the content delivery node is not currently ingesting ABR segments for the channel, the node requests multicast address and ports associated with the channel from a back office, performs a multicast join to an ABR segmented multicast for all encoded segment bitrates for the requested channel and generates the video session manifest, wherein the content delivery node joins the multicast from a multicast segmenter from which streaming clients will receive their streams; and sends the video session manifest to the client gateway, wherein the client gateway is operable to join an MABR multicast of the channel.

In a further aspect, an embodiment of a method for allocating bandwidth within a dynamic streaming pipe for multicast adaptive bitrate (MABR) and unicast adaptive bitrate (UABR) streams is disclosed. The method comprises responsive to a change in requested streams, modelling streaming pipe allocations for a given amount of streaming bandwidth using a list of clients and respective priorities, determining a composite device priority (CDP) to all requested streams, generating a requested streaming list associated with streaming clients for the modeled streaming pipe, and sorting the requested streaming list by CDP in descending order. For each stream in the requested streaming list, the method continues with determining whether the lowest bitrate associated with the stream will fit into the modeled pipe and if the lowest bitrate will fit into the modeled pipe, adding the stream to a list of applied streams along with a weight associated with the CDP for the stream and otherwise adding the channel to a skipped stream list. The method continues with computing an inadequacy metric for each stream in the list of applied streams using the respective weight and assigned bitrate and sorting the list of applied streams by inadequacy metric in descending order. Then, for each stream in the sorted list of applied streams, determining whether the stream can upgrade to a next highest bitrate using the given amount of streaming bandwidth and if the stream can upgrade to the next highest bitrate, changing the bitrate for the stream to the next highest bitrate and returning to the computing step. Once all bitrates are determined, for each stream in the list of applied streams, if the stream is MABR and the stream is not currently connected to a correct Internet Group Management Protocol (IGMP) group, performing an IGMP join to the determined channel multicast bitrate and if the stream is UABR and the stream needs to change streaming bitrate, requesting a new unicast streaming bitrate from the content distribution network (CDN) edge streamer.

In a still further aspect, an embodiment of a premises gateway device comprises a streaming server comprising a streaming processor connected to receive multicast adaptive bitrate (MABR) segments and un-segmented unicast adaptive bitrate (UABR) streams, a segment combiner connected to receive the segmented MABR segments and to provide a combined stream from the segmented MABR segments, a bandwidth allocation module, and an adaptive bitrate (ABR) manifest modifier. The premises gateway device further comprises a hypertext transport protocol (HTTP) server comprising a processor connected to receive ABR segments and to send the ABR segments to a progressive download ABR client.

In a still further aspect, an embodiment of a method of delivering unicast adaptive bitrate (UABR) streaming is disclosed. The method comprises receiving, at a content delivery network (CDN) node, a request for a video asset to be streamed at a selected bitrate and loading a manifest for the requested video asset. The method continues with parsing the manifest for the requested video asset and preloading a plurality of segments across all represented bitrates into a preload cache buffer; fetching requested bitrate segments into a segment combiner; and streaming a combined stream to the requesting entity.

In a still further aspect, an embodiment of a method of delivering unicast adaptive bitrate (UABR) streaming is disclosed. The method comprises responsive to a traditional set top box (STB) request to stream a video asset, a gateway receiving a content delivery network (CDN) location for the video asset and requesting an adaptive bitrate (ABR) manifest for the delivery of the video asset. The method continues with the gateway performing bandwidth allocation for all streaming clients to fit within a streaming video pipe; the gateway requesting a streaming session for the video asset at a selected bitrate; and receiving the streaming video asset at the selected bitrate for delivery to the STB.

In a still further aspect, and embodiment of a premises gateway device for streaming unicast adaptive bitrate (UABR) video is disclosed. The premises gateway device comprises a streaming processor connected to receive streaming content and to provide the streaming content to a set top box (STB) that provides the streaming content to a video display, a memory operably coupled to the streaming process and containing instructions that when performed by the streaming processor, perform the actions: responsive to a request from an STB to stream a video asset, receiving a content delivery network (CDN) location for the video asset, requesting an adaptive bitrate (ABR) manifest for the delivery of the video asset, performing bandwidth allocation for all streaming clients to fit within a streaming video pipe, requesting a streaming session for the video asset at a selected bitrate, and receiving the streaming video asset at the selected bitrate for delivery to the STB.

In a still further aspect, an embodiment of a node in a content delivery network is disclosed. The node comprises a plurality of video assets encoded at a plurality of bitrates, an internal segment streaming buffer cache connected to receive segments of a requested video asset at each of the plurality of bitrates, a multiplexor manifest adaptive bitrate (ABR) switch that is movably connectable to one of the plurality of bitrates at a time, a segment-switcher module connected to change the setting of the multiplexor manifest ABR switch, and a unicast segment streamer connected to receive the selected segments of the requested video asset and to stream the requested video asset as a traditional streamed unicast.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 5A, 5B and 5C depicts a flowchart of a method of managing a request for a video asset from a client device according to an embodiment of the present patent disclosure;

DETAILED DESCRIPTION OF THE DRAWINGS

Figure 1A:
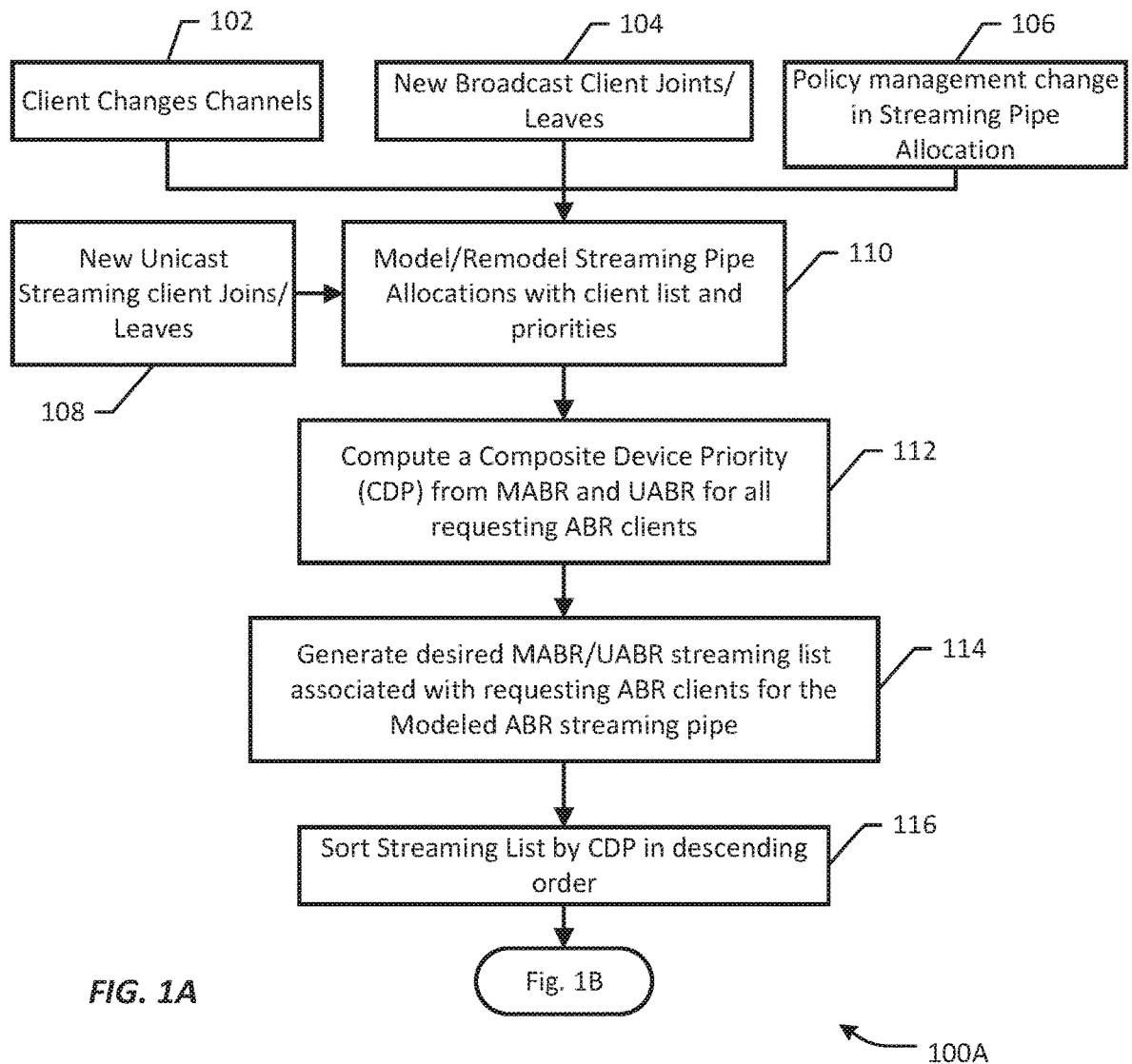
FIGS. 1A and 1B depict a flowchart of a method of managing the allocation of available bandwidth in a streaming video pipe according to an embodiment of the present patent application.

In the following description, numerous specific details are set forth with respect to one or more embodiments of the present patent disclosure. However, it should be understood that one or more embodiments may be practiced without such specific details. In other instances, well-known subsystems, components, structures and techniques have not been shown in detail in order not to obscure the understanding of the example embodiments. Accordingly, it will be appreciated by one skilled in the art that the embodiments of the present disclosure may be practiced without such specific details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple networking functions, in addition to providing support for multiple application services. Subscriber end stations (e.g., set-top boxes, workstations, laptops, netbooks, palm tops, mobile phones, smartphones, multimedia phones, portable media players, etc.) may access or consume content/services provided over broadcast networks (e.g., cable networks) as well as a packet-switched wide area public network such as the Internet via suitable service provider access networks.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a network element, a subscriber device or end station, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. Thus, the storage device or component of a given electronic device may be configured to store code and/or data for execution on one or more processors of that electronic device for purposes of implementing one or more techniques of the present disclosure.

As noted above, the variety of user devices means that the mechanisms for the delivery of video content can also vary greatly across the variety of devices. One example is IPTV, which delivers video to varied clients over IP-based networks that are managed to provide a required level of quality of service and experience. In an IPTV environment, clients wanting to "tune" to a given channel will "join" a multicast video stream, while unicast clients, such as IPTV set top boxes, request a stream from a "video pump" in order to start the flow of packets to the set top box. Additionally, progressive download ABR clients use ABR technologies to download a plurality of video segments from a standard hypertext transfer protocol (HTTP) server; the ABR client requests and receives a manifest that indexes the video segments for the client to download and play out. ABR video has the advantage of allowing clients to dynamically switch between varying bitrate video segments in order to adjust to changing bandwidth conditions. Having become used to progressive download ABR schemes like HTTP Live Streaming (HLS) from Apple, the Moving Picture Expert Group's Dynamic Adaptive Streaming over HTTP (MPEG-DASH), Microsoft's Smooth Streaming, and Adobe's Dynamic Streaming, consumers increasingly expect content to scale to their network conditions. An ability to dynamically switch between varying bitrate video segments for multicast steams is disclosed in co-pending patent application PCT/EP2012/070960—"Methods and Apparatus for Distributing a Media Content Service", filed Oct. 23, 2012. This multicast ABR (MABR) technology utilizes ABR technologies to allow a residential gateway or other customer premises device (CPE) to switch between MABR segments of differing bitrates: the received segments are "stitched" together inside the CPE to provide a unified stream that is delivered to IPTV set top devices in a traditional way. Traditional cable and IPTV unicast delivery, however, has no way of modifying a stream to fit changing network conditions, a hallmark benefit of ABR. Traditional unicast is associated with a single piece of streaming content to a single user at a single bitrate. As such, video quality degrades for the consumer if network conditions suffer and bandwidth is unnecessarily wasted. When network conditions are favorable, the content does not improve in quality, decreasing customer experience in both directions. The integration of multiple types of delivery mechanisms into a home also needs improved techniques to balance the needs of these differing delivery mechanisms.

The present disclosure discloses a number of techniques that can be used singly or together to improve the delivery and management of multiple types of ABR video to a premises. Without appropriate prioritization and management, it is possible to overuse a dedicated video delivery pipe when multiple IPTV set top boxes are consuming video while ABR clients are viewing the same or differing video, causing a disruption in service to one or more devices. In the present application, a method of allowing dynamic bitrate changes in unicast streaming is disclosed as a first technique for improving delivery to a home or other premises. The present application also discloses a method of managing multicast ABR, unicast ABR, and progressive download ABR within the same customer premises device or gateway. This management uses at least three methods to fairly and efficiently allocate available bandwidth to video-consuming clients. A first method is a programmable allocation bandwidth divider that separates the video pipe into a streaming side that is managed by a streaming processor in the premises gateway device and a progressive download side that is managed using weighted fair queuing. Management of the progressive download side of the premises video pipe can be provided by either the HTTP server side of the premises gateway device or by the network, using information provided by the premises gateway device. Consumers can set priorities for individual devices within the premises and can designate a percentage of the video pipe that will be dedicated to streaming (i.e., multicast and unicast to set top boxes); the remaining percentage is dedicated to progressive download clients. A second method addresses the allocation of streaming bandwidth within the streaming side of the video pipe. The ability to dynamically change the bandwidth used by a streaming client allows a more nuanced approach to the allocation of streaming bandwidth. The third method provides the ability to share multicast ABR segments with a progressive download client when the progressive download client is viewing the same content at the same bitrate as a multicast client. This method can utilize manipulation of a manifest for the progressive download ABR client and/or a mechanism that caches the MABR segments. Further, this disclosure allows MABR delivery and UABR to be influenced, via bitrate switching, by the existence of active ABR progressive download client sessions. This also references conflict detection and resolution in an ABR network, as disclosed in U.S. application Ser. No. 14/194,868, filed Mar. 3, 2014 and U.S. application Ser. No. 14/194,918, filed Mar. 3, 2014 in the event the channel cannot be delivered inside the streaming side of the pipe and an attempt is made to deliver the channel in the progressive download side of the pipe. This disclosure allows all varieties of ABR video to be delivered within the same "pipe" as other managed video services, while providing high quality without compromising or inhibiting the provision of other managed video services. Further, efficiencies are created through sharing of ABR segments while adjusting to multicast ABR client usage and progressive download ABR client usage as well as Unicast ABR client usage.

Figure 1B:
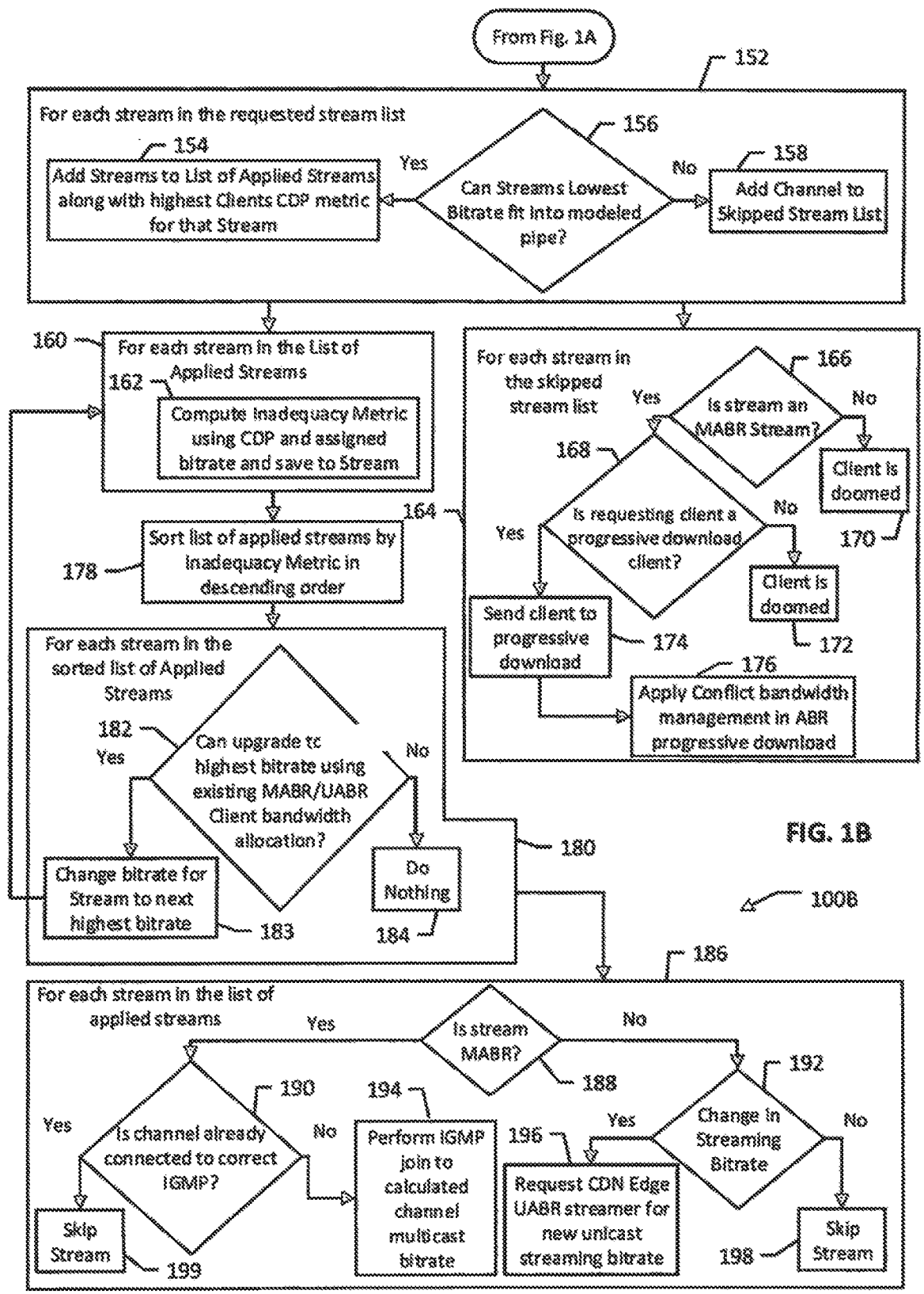
Figure 2A:
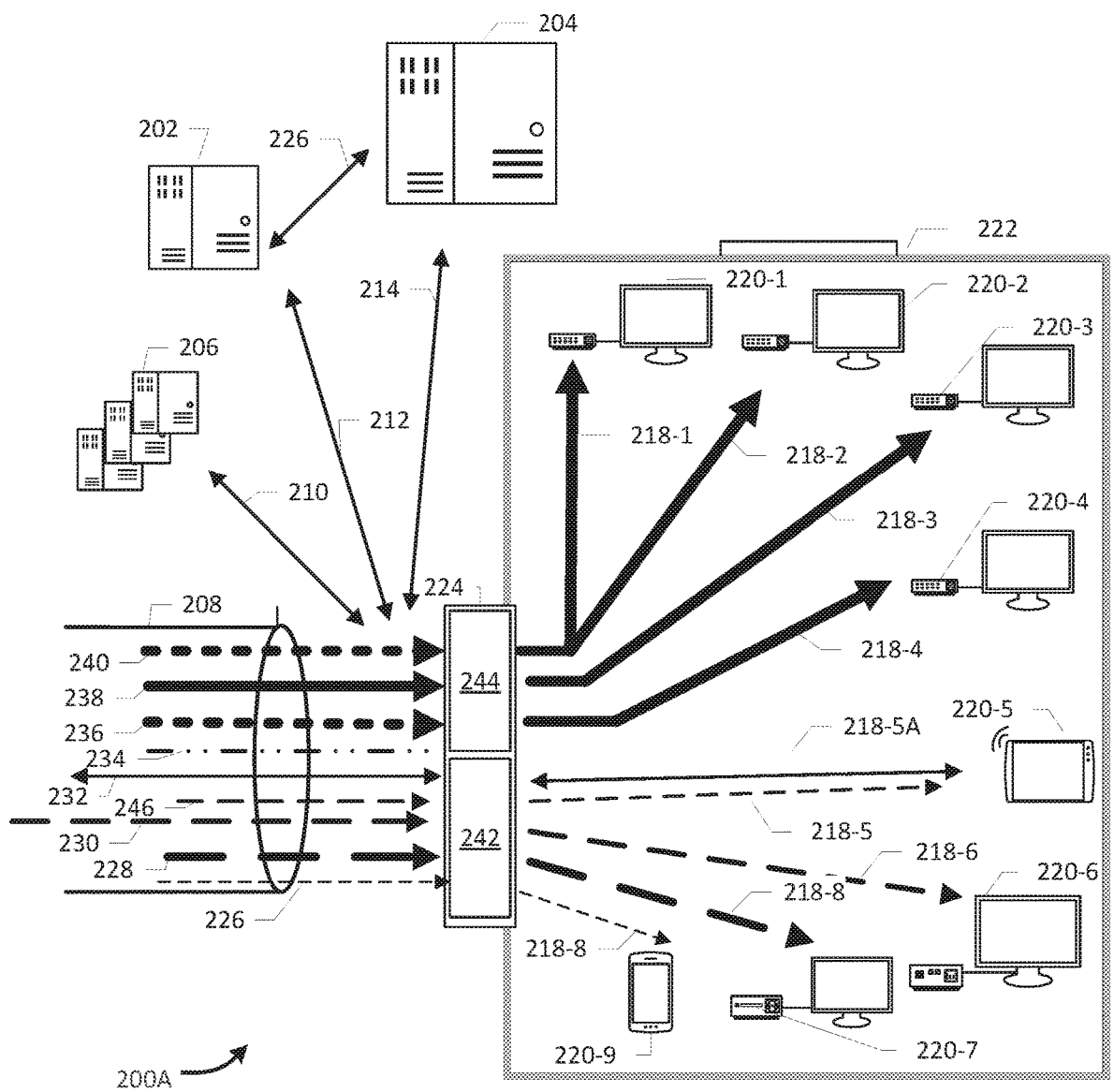
FIG. 2A depicts a system for managing the allocation of bandwidth in a premises video pipe carrying video for both streaming clients and progressive download clients according to an embodiment of the present patent disclosure.

Referring now to the drawings and more particularly to FIGS. 1A and 1B, depicted therein is an example method (100A, 100B) for allocating bandwidth in the streaming side of the dedicated video pipe. This method is performed whenever a streaming client changes channel (102), a new broadcast client joins the streaming side or a client leaves the streaming side (104), a change is mane in the policy management of streaming pipe allocations (106) or a new unicast streaming client joins or leaves (108). Each of these changes will prompt a modeling or remodeling (110) of the streaming pipe bandwidth allocations with the associated client list and their associated priorities. An example model of multiple requesting clients for a premises is shown in FIG. 2A, which will be discussed below. A Composite Device Priority (CDP) is computed (112) for each requested stream of video, including MABR and UABR for all requesting clients. The CDP is simply a way to reflect a collective priority when several devices are watching a single multicast channel. In one embodiment of the disclosure, the CDP for a channel is simply the highest priority of all the clients watching the channel, so that if a priority 1 client and a priority 3 client are both watching Channel A, the CDP for Channel A is 1. It should be noted at this point that if a progressive download ABR client is watching a multicast channel that is also being watched by a streaming client, the progressive download ABR client will be included in the CDP. Once CDP are determined, a desired MABR/UABR streaming list associated with requesting ABR clients is generated (114) for the modeled ABR streaming pipe and the streaming list is sorted (116) by CDP in descending order, so that higher priority streams are considered first. For each stream in the requested streaming list (152), a determination is made whether the stream's lowest bitrate will fit into the modeled pipe (156). If the stream's lowest bitrate will fit into the modeled pipe (Yes to 156), the stream is added (154) to a list of applied streams, along with the associated CDP. If the stream's lowest bitrate will not fit into the modeled pipe (No to 156), the stream is added to a skipped stream list (158). For each stream in the skipped stream list, a determination is made whether the stream is an MABR stream (166); if the skipped stream is UABR (No to 166), the client requesting that stream is doomed (170) and will be rejected; appropriate messaging can be used to let the client know that the bandwidth is not available at this time. If the stream is MABR (Yes to 166), a further determination is made whether the associated client(s) is a progressive download client (168). Any streaming client associated with the MABR stream (No to 168) is also doomed (172) and will be rejected with appropriate messaging. A progressive download client associated with the multicast stream (Yes to 168) is sent to the progressive download side of the video pipe (174) and bandwidth conflict management in ABR progressive download is applied (176). Applicant has disclosed, in co-pending applications U.S. Ser. No. 14/194,868 and U.S. Ser. No. 14/194,918, both filed on Mar. 3, 2014, a method of bandwidth conflict management that can be used on the progressive download side of the video pipe.

For each stream in the list of applied streams (160), an inadequacy metric is computed using the CDP and the assigned bitrate and this inadequacy metric is saved to the stream (162). The inadequacy metric is a measure of how far out of balance an allocation to a stream is with regard to its priority and the priority of the other streams. One example of determining the inadequacy metric is discussed below, although other measures of an imbalance can be used in practicing the disclosed method. It is common to assign weights to video devices that reflect the share of bandwidth that should be given to that video device, based on the device's priority. For example, a priority 1 device may have a weight of 3, a priority 2 device a weight of 1.5 and a priority 3 device a weight of 0.75. These weights indicate that the priority 1 device will ideally receive twice as much bandwidth as a priority 2 device and four times as much bandwidth as the priority 3 device. In one embodiment, an inadequacy metric is calculated as the weight associated with the CDP of a stream divided by the current bandwidth allocation to the stream. Once an inadequacy metric has been computed for each stream, the list of applied streams is sorted by inadequacy metric in descending order (178), so that the stream that is most out of balance is considered first. Then, for each stream in the sorted list of applied streams, taken in descending order (180), a determination is made whether the stream can be upgraded to the next highest bitrate using the existing MABR/UABR bandwidth allocation (182). If the stream cannot be upgraded to the next highest bitrate within the streaming side of the pipe, nothing is done for that stream (184). However, if the stream can be upgraded to the next highest bitrate within the streaming side of the pipe, the bitrate for the stream is changed to the next highest bitrate (182) and the method returns to step 160. In practice, since only one stream has a changed bitrate, it is necessary only to recalculate the inadequacy metric for the stream that has just been bumped to a new bitrate and to again sort the list of applied streams. This return to an earlier step is necessary because the stream that has just received a bump in bitrate may still be the furthest out of balance, e.g., if the stream receiving the bump is associated with a priority 1 device while the other devices are priority 3. Once step 180 has been completed, the method checks to ensure that each stream is subscribed to the correct bitrate. For each stream in the list of applied streams (186), a determination is first made whether the stream is MABR (188). The bitrate for MABR streams is changed by joining a stream at the new bitrate while dropping a join to a stream at the old bitrate. Therefore, if the steam is MABR (Yes to 188) and the channel is already connected to the correct Internet Group Management Protocol (IGMP) multicast (Yes to 190), there is no need to change the connection and the stream is skipped (199). If the MABR channel is not already connected to the correct IGMP multicast (No to 190), the gateway leaves the existing channel multicast and performs an IGMP join to the calculated channel multicast bitrate (194). Similarly, if the stream is not MABR (No to 188) but UABR, a determination is made whether the UABR stream requires a change in streaming bitrate (192). If a change in bitrate is required (Yes to 192), the gateway requests a new unicast streaming bitrate from the CDN Edge UABR streamer (196); otherwise the UABR stream is skipped (198).

Having looked at the allocation of bandwidth in the streaming side of the video pipe, we turn to FIG. 2A, which illustrates a dedicated premises video pipe 208 that is served by a premises gateway device 224 and which provides video to both streaming clients and progressive download clients according to an embodiment of the disclosure. Illustrated as well are elements of the network that are involved in providing and managing the video to the premises. In this figure premises gateway device 224 receives the video streams that are sent through video pipe 208 and distributes these video steams to devices on the premises such as managed set top boxes 220-1, 220-2, 220-3, 220-4 and various progressive download ABR client devices, such as tablet 220-5, PS3 box 220-6, over-the-top (OtT) device 2207 and mobile phone 220-8. One skilled in the art will understand that the dedicated pipe 208 will typically have a portion of the bandwidth that is dedicated to data other than video and another portion of the bandwidth that is dedicated to voice-over-IP (not specifically shown). However, as these dedicated portions neither affect nor are affected by the video allocations, those dedicated portions of the pipe are not shown or discussed. Premises gateway device 224 is divided into two portions: a streaming server 244, through which the streaming video flows, and an HTTP server 242, through which the progressive download video passes. The two sides of video pipe 208, i.e., streaming and progressive download, are separated by a bandwidth allocation divider 234 that will be discussed later in this application. In this example, set top boxes 220-1 and 220-2 are both watching the same channel of multicast video, e.g., Channel 1 and are thus able to share a single inbound stream 240, which is then sent to both set top boxes as streams 218-1 and 218-2. Note that, as described in, stream 240 inbound to gateway 224 is segmented, i.e., portions of the video are separated by short intervals. It is these intervals that allow time for the gateway to drop a multicast stream at one bitrate and to join a multicast stream at a new bitrate. Once the inbound stream reaches streaming server 244, the segments are "joined", so that the set top boxes receive the continuous stream of video that they have always received. Set top box 220-3 in this example is watching a unicast video. This stream is received at the gateway as a continuous stream 238 and streamed to the set top box as stream 218-3. The means for changing the bitrate for UABR client 220-3 are discussed later in this disclosure with reference to FIGS. 10 and 11. Set top box 220-4 is illustrated as watching a multicast ABR channel received as stream 236 and streamed to the set top box as stream 218-4. As shown herein, set top box 220-4 is watching a different channel from set top boxes 220-1 and 220-2, e.g., Channel 3.

On the progressive download side of video pipe 208, tablet 220-5 is also watching multicast Channel 3. However, because tablet 220-5 is currently in an area of the premises that does not have a good WLAN connection, tablet 220-5 is not able to utilize the same bitrate as set top box 220-4 and therefore has requested this channel through progressive download. In communication 218-5A, tablet 220-5 has requested a manifest for the channel via progressive download ABR and premises gateway device 224 has passed the request to the content delivery network. Once the manifest is delivered, tablet 220-5 is able to request the channel at an appropriate bitrate. This copy of Channel 3 is received inbound to premises gateway 224 as stream 246 and passed to tablet as stream 218-5. The remaining progressive download devices are receiving unicast progressive download, with inbound stream 230 passing through gateway 224 to PS3 box 220-6 as ABR stream 218-6, inbound stream 228 passing through gateway 224 to OtT set top box 220-7 as ABR stream 218-7, and inbound stream 226 passing through gateway 224 to mobile phone 220-8 as ABR stream 218-8. Also shown in this figure are delivery nodes of content delivery network (CDN) 206, which provide manifests for UABR and progressive download ABR streams via link 210; the manifests include those for MABR, ABR. The back office for managed multicast and ABR 204 provides premises gateway device 224 with a catalog for video-on-demand (VoD) and for video saved in a network personal video recorder (nPVR) with asset URLs via link 214. Back office 204 also provides an MABR broadcast channel map and mappings to MABR bitrates. Operator/subscriber ABR policy management system 202 exchanges ABR session policies with back office 204 via link 226 and provides premises gateway device 224 with ABR content, MABR and UABR device policy interfaces via link 212.

Figure 2B:
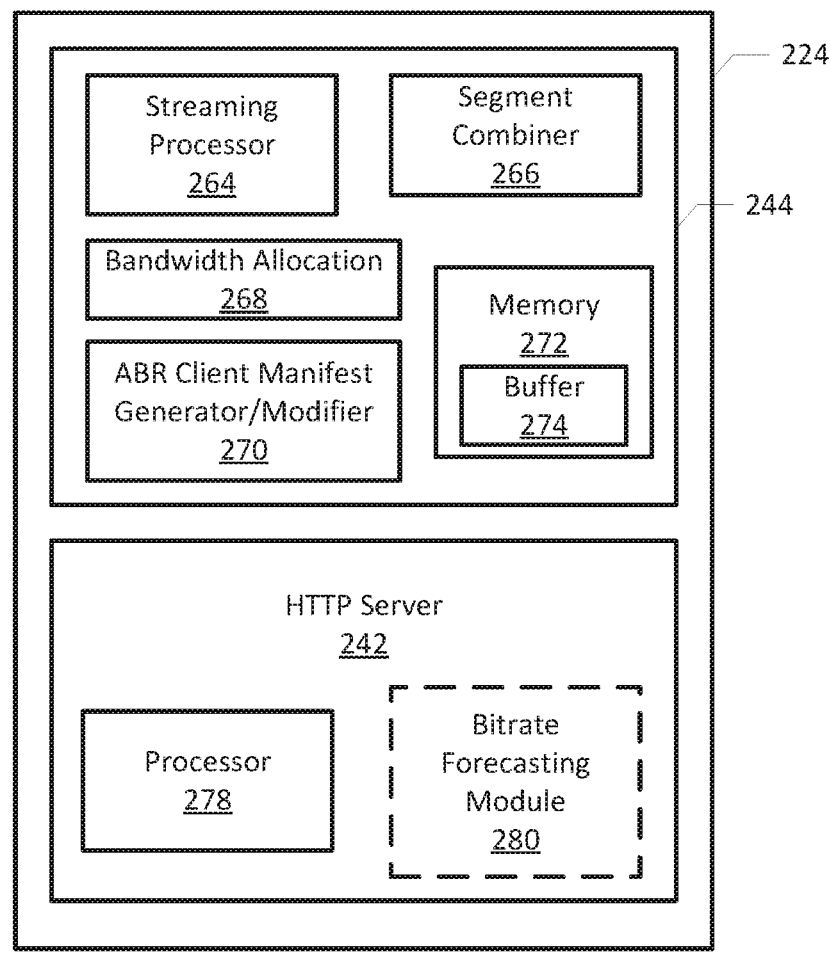
FIG. 2B depicts a premises gateway device that manages the allocation of bandwidth in a premises video pipe carrying video for both streaming clients and progressive download clients according to an embodiment of the present patent disclosure.

FIG. 2B illustrates an expanded view of premises gateway device 224, which is composed of streaming server 244 and HTTP server 242. HTTP server 242 contains one or more processors 278 and may optionally contain a bitrate forecasting module 280, as described in U.S. application Ser. No. 14/194,918. Streaming server 244 includes one or more streaming processors 264 and memory 272, which includes buffer 274. Bandwidth allocation module 268 allocates bandwidth within the streaming side of video pipe 208. Segment combiner 266 receives the segmented sections of video for MABR clients and combines those segments to provide the continuous stream expected by the set top boxes. ABR client manifest generator/modifier 270 can create or modify an ABR manifest for multicast channels received on the streaming side of video pipe 208 and use that generated or modified manifest to provide the channel to progressive download clients on the progressive download side of the video pipe.

Figure 3A:
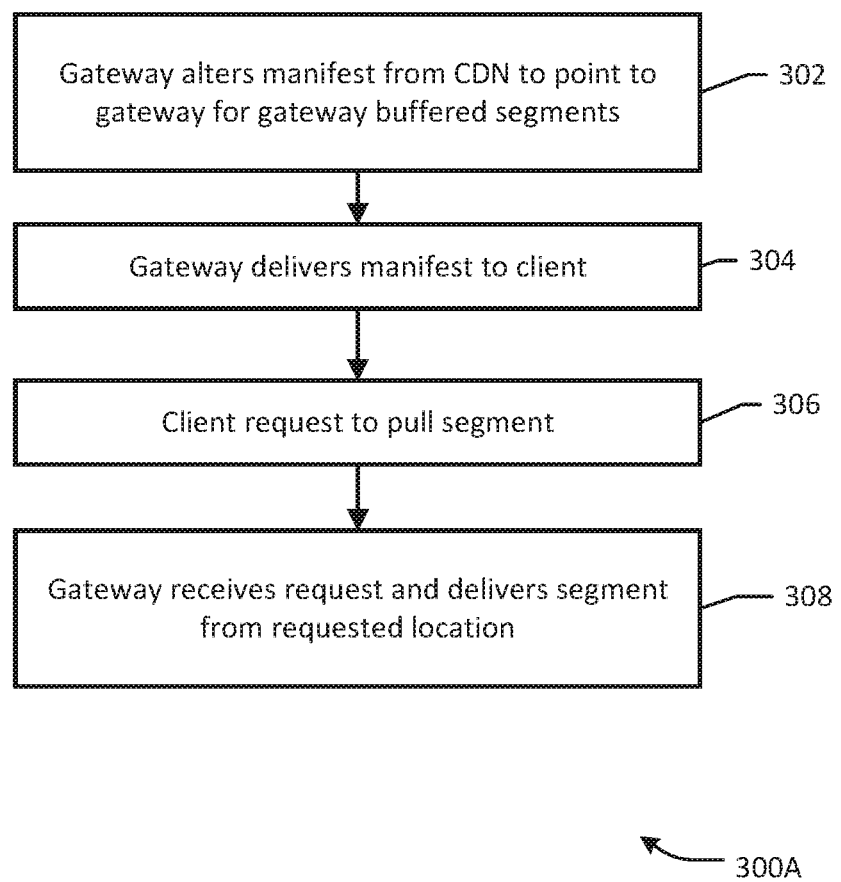
FIG. 3A depicts a flowchart of a method of providing video to a progressive download client according to an embodiment of the present patent disclosure.
Figure 3B:
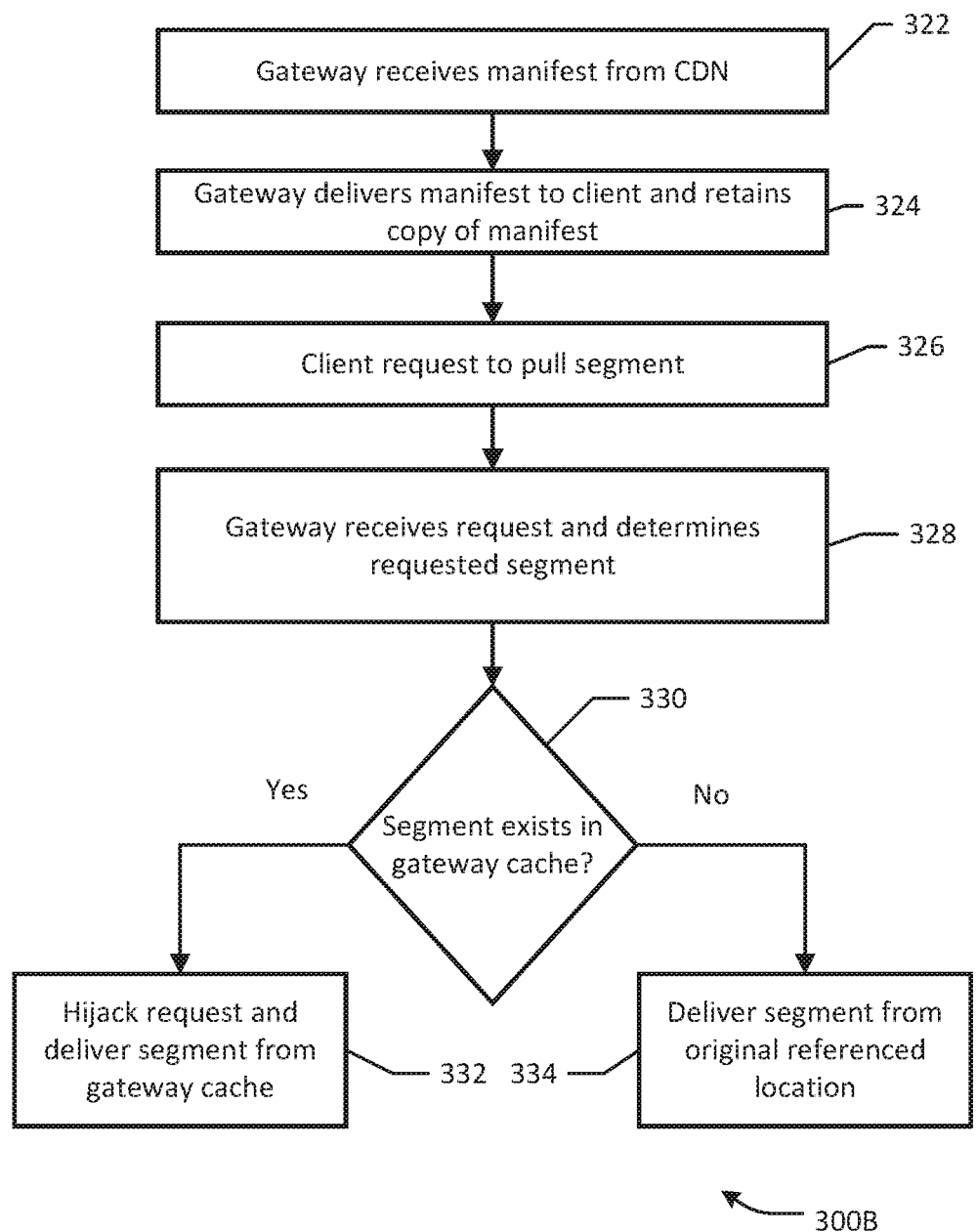
FIG. 3B depicts a flowchart of a method of providing video to a progressive download client according to an embodiment of the present patent disclosure.
Figure 4:
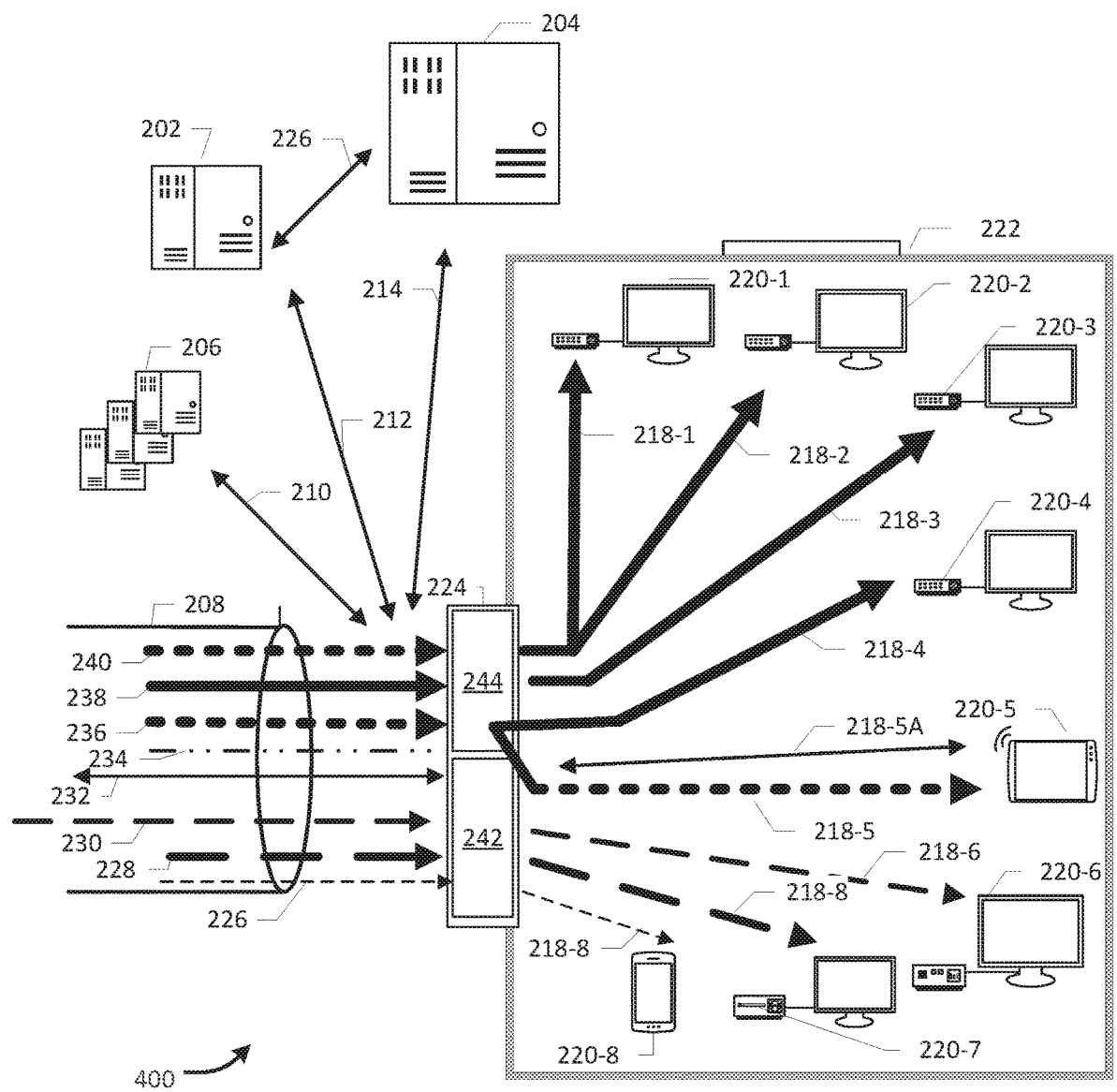
FIG. 4 depicts a system for sharing bandwidth between a streaming client and a progressive download ABR client when both clients are watching the same channel at the same bitrate according to an embodiment of the present patent disclosure.

Turning now to FIGS. 3A and 3B, two alternate methods of sharing MABR segments with a progressive download client are disclosed. Method 300A begins after the premises gateway device has requested and received a manifest for a channel on behalf of a progressive download client. The received manifest will contain URL references for each bitrates at which the channel is provided. If the premises gateway device is receiving the channel at a specific bitrate for a streaming client, the gateway device alters the URLs in the manifest that are associated with the specific bitrate to point to the gateway for gateway buffered segments (302); the gateway device then delivers the altered manifest to the requesting client (304). The client sends a request to pull segments (308) to the premises gateway device. The gateway device receives the request and delivers the requested segment from the requested location (308), which can be the CDN or the gateway's buffer. In alternate method 300B, the gateway receives the manifest from the CDN (322) and delivers the manifest to the client and retains a copy of the manifest for itself (324). The client then begins to pull segments (328); the gateway receives the request and examines the request to determine the requested segment (328). Using the retained copy of the manifest, the gateway device is able to determine whether the requested segment exists in the gateway cache (330). If the requested segment exists in the gateway cache (Yes to 330), which will occur if a streaming device is watching the same channel, the gateway will hijack the request and deliver the segment from the gateway cache (332). If, however, the segment does not exist in the gateway cache (No to 330), the gateway device will pass the request to the CDN and deliver the segment from the originally referenced location according to the manifest from the CDN (334). An example of this sharing is shown in FIG. 4. This figure is similar to FIG. 2, except that when tablet 220-5 requests segments for channel 3 via link 218-5A the tablet is currently able to receive at the same bitrate as device 220-4. Consequently, the request is not passed to the CDN; instead the segments of channel 3 that were received through the streaming side of video pipe 208 as inbound stream 236 are present in the cache and the request from tablet 220-5 is filled from the cache as stream 218-5. It should be noted that while the inbound stream to premises gateway device 224 is limited by agreement with the network, the outbound stream from gateway device 224 to local devices is not bound by the same constraints. In the scenario shown in FIG. 4, progressive download clients 220-6, 220-7 and 220-8 are receiving progressive download video through the progressive download side of the pipe and may have their requests throttled or otherwise managed to fit within the constraints of the progressive download side of the pipe. Because progressive download tablet 220-5 is able to receive channel 3 at the same bitrate as streaming client 220-4, table 220-5 may be able to receive at a higher bitrate than it might normally be allocated based on its own priority. The actual bitrate would depend, of course, on the actual management decisions regarding streaming clients versus progressive download clients, as well as the relative priorities of the individual clients.

Figure 4A:
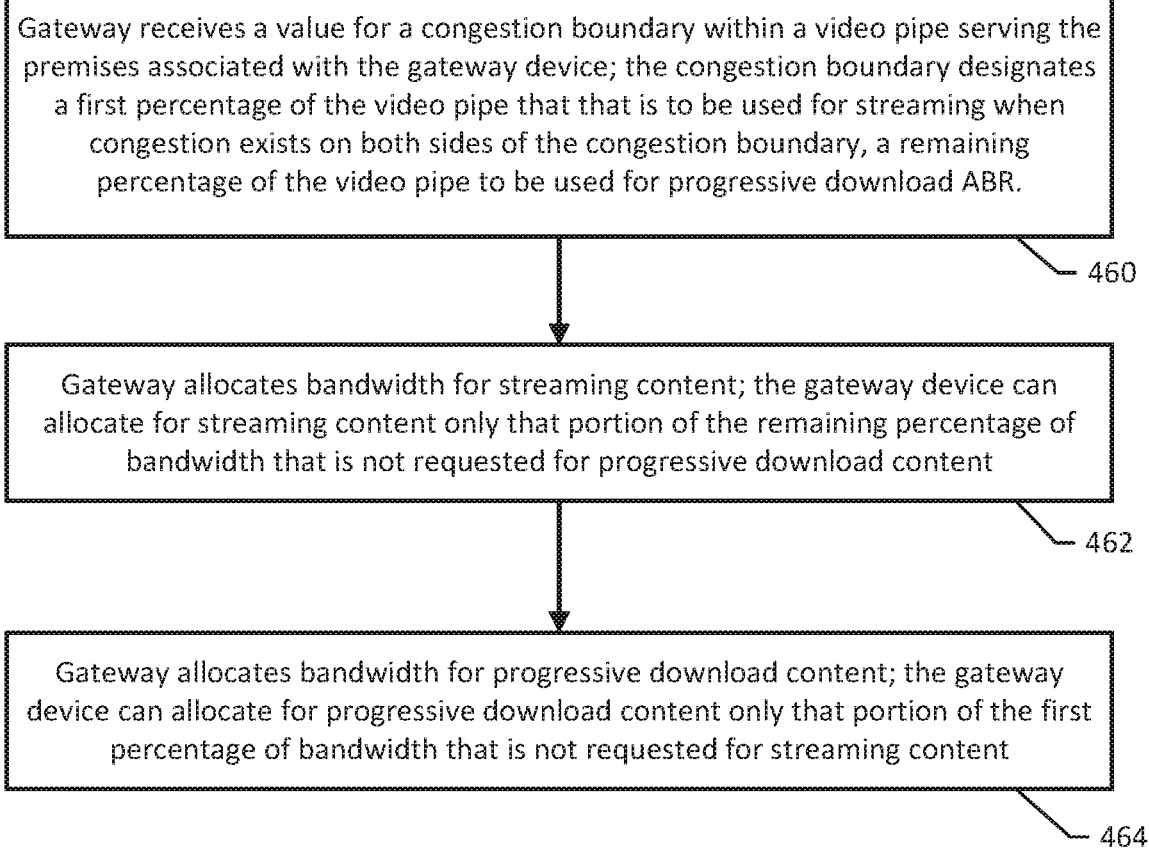
FIG. 4A depicts a flowchart of a method of balancing the contention for bandwidth between streaming clients and progressive download clients according to an embodiment of the present patent disclosure.

Looking now at FIG. 4A, a method of balancing the contention for bandwidth between streaming clients and progressive download clients is disclosed according to an embodiment of the disclosure. It can be noted that streaming clients and progressive download clients receive video in very different ways. A streaming client, such as a traditional set top box, is designed to receive a stream of video that is immediately rendered and displayed to the user. Because of this design, a streaming client must have a constant bandwidth on which to receive video. Progressive download ABR clients work in an entirely different manner. Progressive download ABR clients will, as the name implies, progressively download the file of video, but will not expect the file to arrive as a constant stream. Instead the progressive download ABR client will pull or request a given segment of the video at as high a bitrate as the client is able to get. Once the given segment is received, the client will request the next segment of video. Depending on the specific embodiment, a progressive download client will start showing the video to the user once there is enough video in the buffer to allow the client to continue to receive video at a faster rate than it is being watched. The congestion boundary disclosed herein is a means of keeping the bursts of video required by the progressive download clients from interfering with the constant bandwidth required by the streaming clients. In method 400A, the premises gateway device receives a value for a congestion boundary within a video pipe serving the premises associated with the gateway device (460). This congestion boundary designates a first percentage of the video pipe that is to be used for streaming ABR content when congestion exists on both sides of the congestion boundary. A remaining percentage of the video pipe is to be used for progressive download ABR. The value of the congestion boundary can be determined by the user according to the needs and use of video within the premises and can be adjusted as necessary; either the user or network personnel can perform the actual setting of the congestion boundary. Once the value of the congestion boundary is set, the premises gateway device allocates bandwidth for streaming content and can allocate for streaming content only that portion of the remaining percentage of bandwidth that is not requested for progressive download content (462). The premises gateway device also allocates bandwidth for progressive download content and can allocate for progressive download content only that portion of the first percentage of bandwidth that is not requested for streaming content (464). This means that the congestion boundary is only used when there is usage on both sides of the video pipe. At any time that only streaming clients are in use in the video pipe, the streaming clients can use up to 100% of the managed video pipe. However, if a progressive download client joins the mix, the progressive download client cannot be denied bandwidth unless that progressive download client or clients try to use more than is allocated to the progressive download side of the video pipe. The same is also true in the reverse situation. When only progressive download clients are present, they can use up to 100% of the video pipe, but cannot deny bandwidth to a streaming client that joins the mix and requests bandwidth up to the amount allocated to the streaming side of the video pipe. Examples of specific allocations within the video pipe using the congestion boundary are discussed below with regard to FIGS. 6-8.

Figure 5A:
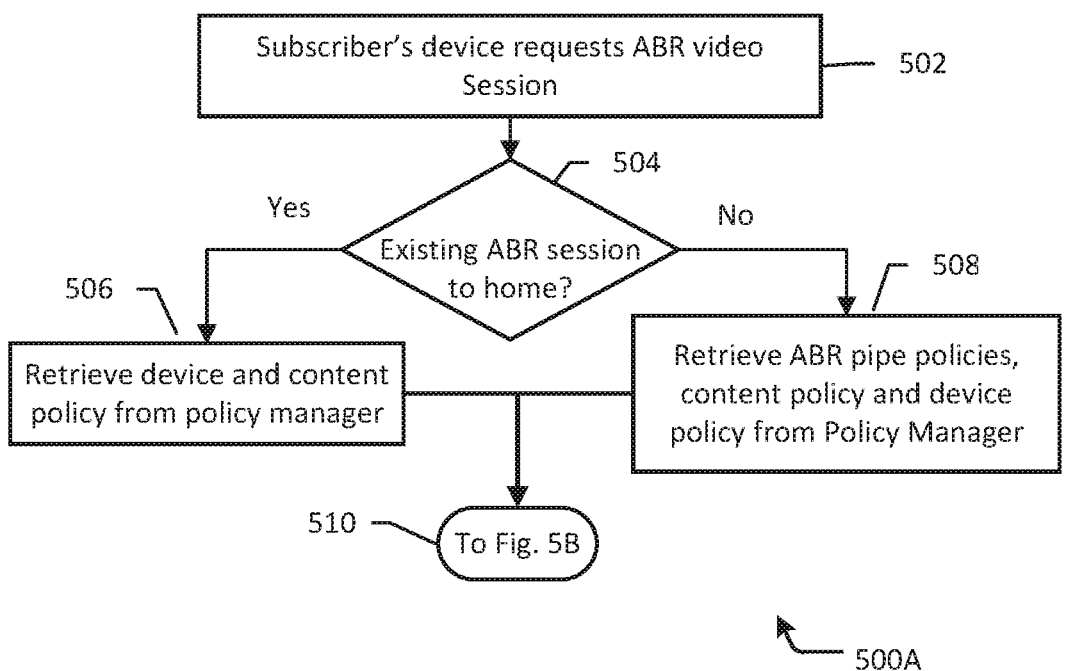

Turning now to FIGS. 5A-5C, a method of managing a request for a video asset from a client device is disclosed according to an embodiment of the present patent disclosure. The method begins when a subscriber's device requests an ABR video session (502). In this context, the requested ABR video session may be an MABR session, a UABR session or a progressive download ABR session. The premises gateway device receives the request and determines whether there is an existing ABR session to the home (502) or other premises served by the gateway device. If there is an existing ABR session to the home (Yes to 504), the gateway device retrieves device and content policy for the requesting device from the policy manager (506), e.g., policy manager 202. If there is not an existing ABR session to the home (No to 504), the gateway device retrieves ABR pipe policies, as well as device and content policy for the requesting device from the policy manager (508). The gateway device then determines whether the requested content is MABR content (522). If the content is not MABR content (No to 522), then a determination is made whether the client is a progressive download client (526). If the client is a progressive download client (Yes to 522), the gateway sends an ABR manifest to the client after receiving the manifest from the content delivery network and starts the client in the bandwidth managed progressive download pipe (530). As noted previously, the progressive download pipe is managed using weighted fair queuing, which is disclosed in co-pending U.S. application Ser. Nos. 14/194,868 and 14/194,918, and is not further described herein. If the client is not a progressive download client (No to 526), the client is managed in the streaming side of the video pipe using UABR techniques described herein with reference to FIGS. 10 and 11. However, if the requested content is MABR content (Yes to 522), the premises gateway device receives CDN content location from the back office and requests a video session manifest from the CDN, which typically redirects this request to a correct edge delivery node (524). The edge delivery node of the CDN determines whether it is already ingesting ABR segments from a multicast segmenter and generating a manifest for the requested channel (562). If the CDN is not already performing these actions (No to 562), the CDN delivery node requests the channel's ABR multicast address and ports from the back office (566). The CDN delivery node performs a multicast join to the ABR segmenter for all encoded segment bitrates for the requested channel and generates an ABR manifest for the requested ABR session (568). If the CDN was already ingesting ABR segments (Yes to 562) or once the join to multicast segments is performed, the premises gateway device receives the manifest from the CDN edge delivery node for the requested video session (564). The premises gateway device then determines whether the client is a progressive download client (570). If the client is a progressive download client (Yes to 570), the gateway device delivers the manifest for the requested channel to the requesting ABR client (582). Note that the gateway device may have altered the manifest that is delivered to the client, as detailed in FIG. 3. The progressive download ABR client then begins pulling video segments (584). On the other hand, if the MABR content is being watched on a streaming client (No to 570), the gateway device determines whether the multicast channel is already being watched in the home (574). If the multicast channel is not already being watched in the home (No to 574), the gateway device receives the ABR manifest from the CDN edge node for the requested video session (572). Reference is made to the manifest redirection discussed in FIG. 3 (576) and alterations are made to the manifest to allow progressive download clients to use segments from the cache. This can be performed even if no progressive download clients are currently watching the channel, so that the gateway device is prepared if a progressive download client tunes to this channel. The gateway device then joins a multicast segment for the channel (578). Bandwidth management for the multicast segment will occur as shown in FIG. 1. After the requested channel has been joined or else if the multicast channel was already being watched in the home (Yes to 574), the gateway device delivers the combined segmented stream to the joining set top box (580).

Figure 6:
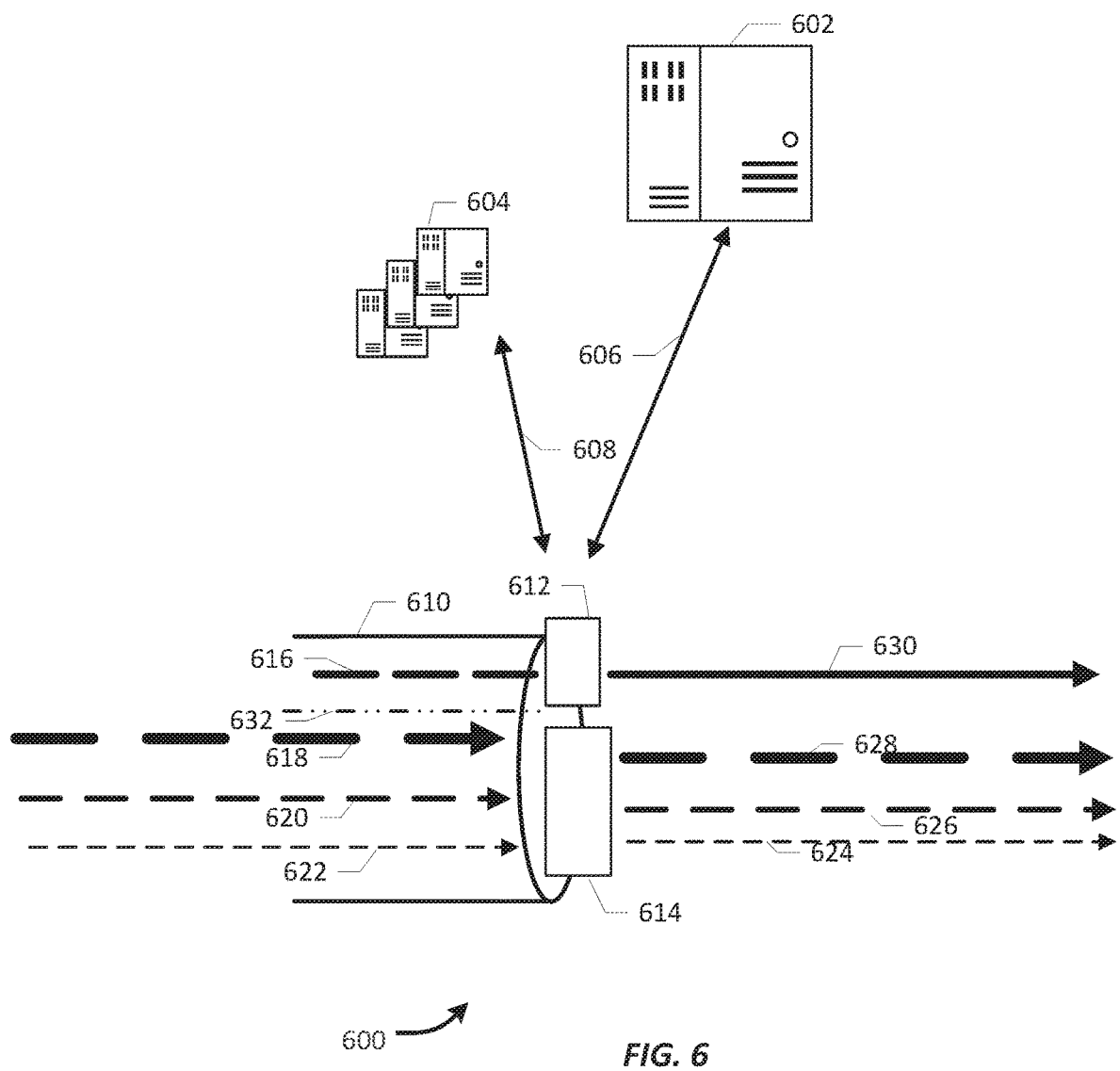
FIG. 6 depicts an allocation of bandwidth within a premises video pipe according to an embodiment of the present patent disclosure.
Figure 7:
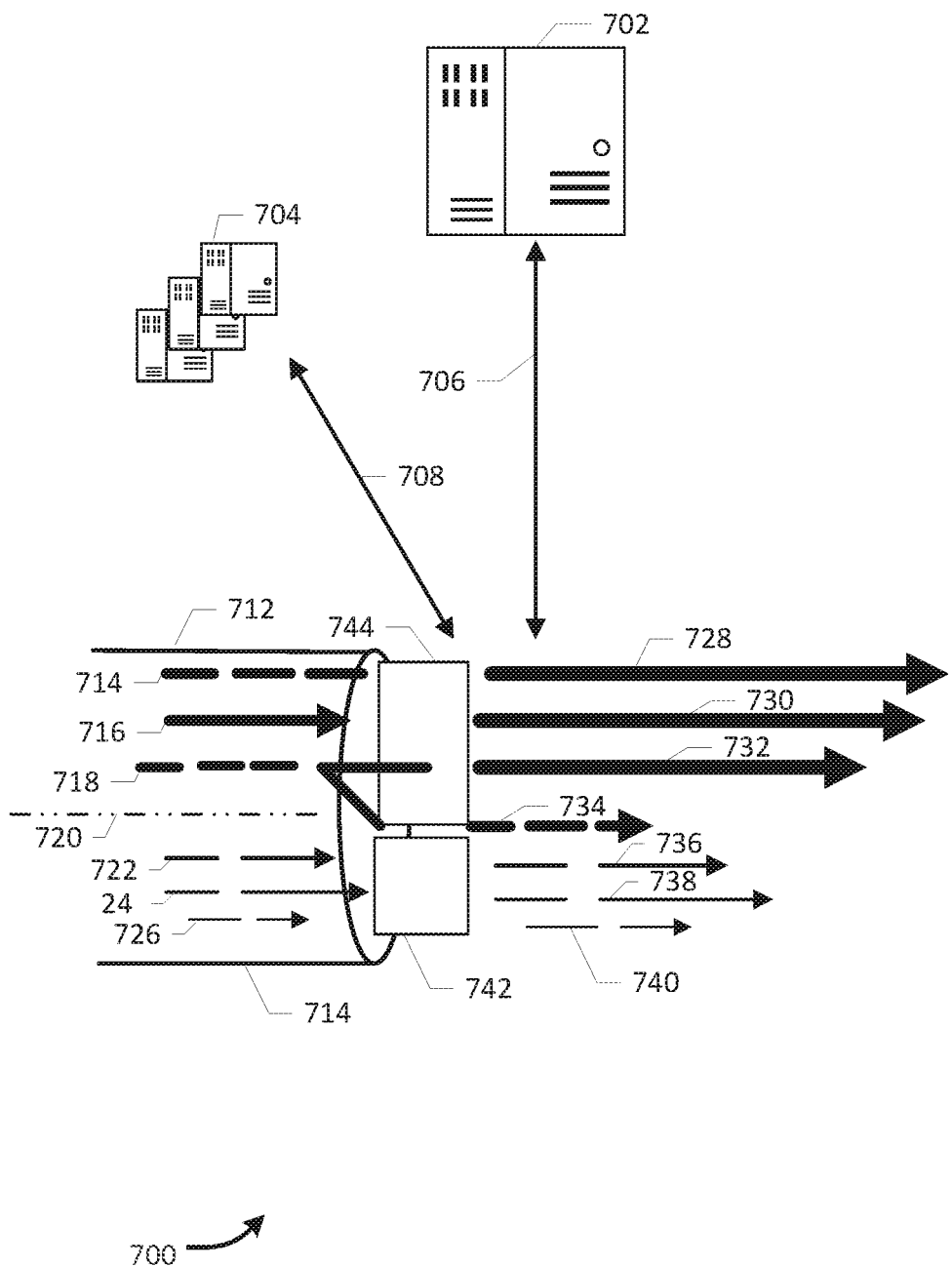
FIG. 7 depicts an allocation of bandwidth within a premises video pipe according to an embodiment of the present patent disclosure.
Figure 8:
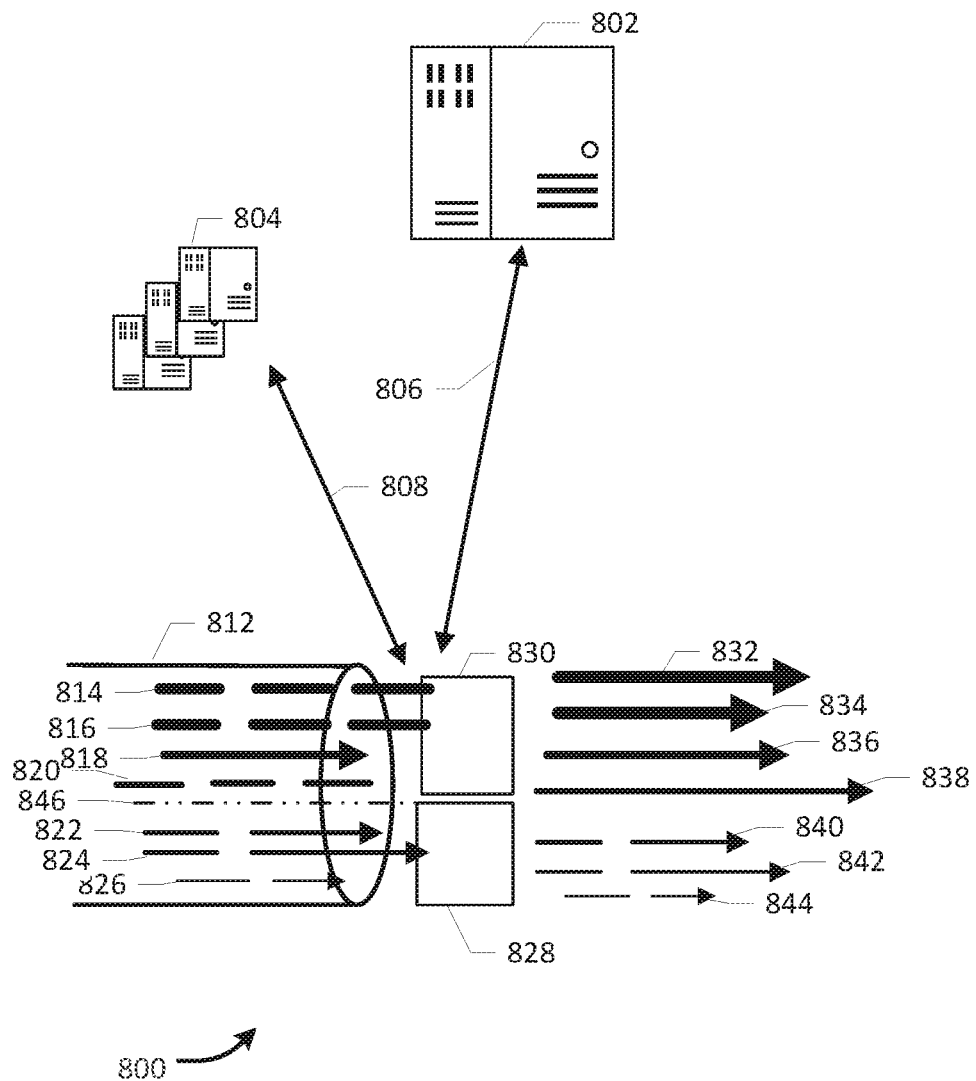
FIG. 8 depicts an allocation of bandwidth within a premises video pipe according to an embodiment of the present patent disclosure.

Turning now to FIGS. 6-8, several examples of how use of the congestion boundary and the bandwidth management methods discussed herein and in the related applications might play out in an actual situation are shown. In each of these examples, the incoming managed video delivery pipe is allocated for 20 Mbs of total video. Additionally, value of the congestion boundary is set to 75% for streaming video, leaving 25% remaining for progressive download. In the first example in FIG. 6, only a single streaming client is active and is watching an MABR stream. The client is a priority 3, but because congestion boundary 632 is set to 75% or 15 Mbs, this client is allowed to receive the highest bitrate of video that is available and that the client can utilize, which in this example is 5 Mbs. The segmented stream 616 is received at streaming server 612, where the stream is combined and sent to the client as stream 630. Because so little streaming video is currently being consumed on the premises, the three progressive download clients that are currently active are allowed to consume 75% of the bandwidth of the incoming video pipe. The progressive download video is managed using weighted fair queuing so that inbound stream 618, which is being delivered as outgoing stream 628 to a Priority 1 client with a weight of 3.0, is given an allocation of 8.571 Mbs. Similarly, inbound stream 620, which is being delivered as outgoing stream 626 to a Priority 2 client with a weight of 1.5, is given an allocation of 4.286 Mbs and inbound stream 622, which is being delivered as outgoing stream 624 to a Priority 3 client with a weight of 0.75, is given an allocation of 2.14 Mbs.

In FIG. 7, the total pipe allocation remains 20 Mbs and congestion boundary 720 also remains at 75%. However, in this scenario, two additional streaming clients have joined the mix. Given the large percentage of the pipe that has been allocated to streaming clients in this example, all three streaming clients have been able to receive the maximum available bandwidth for their consumption, in this example 5 Mbs for a total streaming bandwidth of 15 Mbs. Since this allocation still fits within the amount allowed by congestion boundary 720, no reduction of bandwidth is necessary on the streaming side of pipe 712. Inbound stream 714 is an MABR stream of Channel 1 that is being combined and delivered to a Priority 1 client as stream 728; inbound stream 716 is a UABR stream that is delivered to a Priority 3 client as stream 730; and inbound stream 718 is an MABR stream of Channel 3 that is delivered to a Priority 2 client as stream 732. An additional progressive download client has also joined the clients vying for bandwidth, but because this new progressive download client is also watching Channel 3, this new client is able to receive outbound stream 734 without adding a new inbound stream to the progressive download side of the pipe. Each of the original progressive download clients has had to accept a reduced bandwidth for their video, so that inbound stream 722, which is delivered as outbound stream 736 to a Priority 1 client, receives an allocation of 2.857 Mbs; inbound stream 724, which is delivered as outbound stream 738 to a Priority 2 client, receives an allocation of 1.428 Mbs; and inbound stream, which is delivered as outbound stream 740 to a Priority 3 client, receives an allocation of 0.714 Mbs.

In FIG. 8, the use of the pipe has changed again, with an additional Priority 1 streaming client being added. With four streaming clients requesting bandwidth, it is no longer possible to give each streaming client the maximum bandwidth and remain within the 75% or 15 Mbs allowed to streaming clients when progressive download clients are also experiencing congestion. Using the method shown in FIG. 1, the allocations are as shown: MABR stream 814, which is delivered as outbound stream 832 to a Priority 1 client, receives the maximum of 5 Mbs, as does MABR stream 816, which is delivered as outbound stream 834 to a second Priority 1 client; incoming UABR stream 818, which is delivered as stream 836 to a Priority 2 client, receives an allocation of 3 Mbs; and incoming MABR stream 820, which is delivered as stream 838 to a Priority 3 client, receives an allocation of 2 Mbs. The client that was sharing bandwidth with Channel 3 is no longer present, but the three original progressive download clients are able to remain at their previous levels, i.e., stream 822/840 receives 2.857 Mbs, stream 824/842 receives 1.428 Mbs and stream 826/844 receives 0.714 Mbs.

Figure 9:
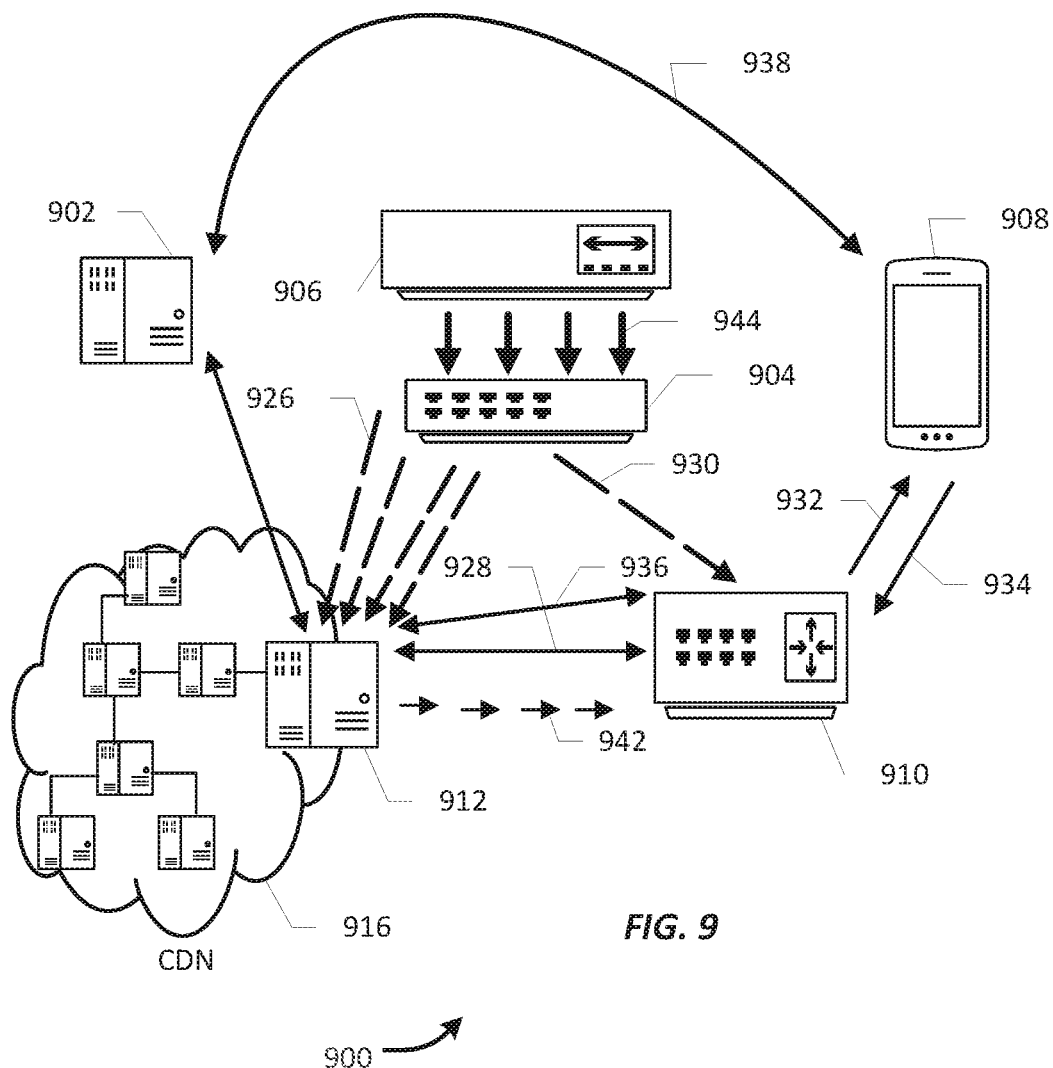
FIG. 9 depicts a system for synchronizing MABR and progressive download ABR delivery of a requested channel according to an embodiment of the present patent disclosure.

Turning next to FIG. 9, the nodes and notifications necessary to provide MABR segments that can be shared between both MABR clients and progressive download clients are illustrated. Shown are back office node 902 and content delivery node (CDN) 916, which includes edge node 912. The CDN provides video content to premises gateway device 910 and progressive download client 908. MABR content is provided by adaptive bitrate friendly video encoder 906, which provides multicast ABR encoded streams for a given channel at various bitrates, e.g., 5 Mbs, 3 Mbs, 1 Mbs and 600 Kbs. These encoded streams are provided to multicast segmenter 904, which segments and compresses the content as described in application PCT/EP2012/070960, filed Oct. 23, 2012. CDN edge node 912 joins all of the provided multicasts 926, so that these can be provided to progressive download clients, if requested. The same multicast segmenter 904 provides a multicast stream at a requested bitrate, e.g., 5 Mbs, to gateway device 910 for consumption by streaming clients. Progressive download client can receive a channel/program guide with URLs to the channel video asset from back office 902 via interface 938 and can request and receive a manifest for the channel video asset via gateway device 910 via interfaces 934, 932. Gateway 910 requests and receives the progressive download ABR manifest from CDN node 912 via interface 928; when progressive download segments are requested from the CDN, gateway 910 receives the requested segments from node 912 via interface 942. For streaming clients, gateway 910 receives a channel configuration manifest for the channel from CDN node 912 via interface 936 and receives MABR segments from multicast segmenter 904 at a requested bitrate via interface 930. Note that it is necessary that the same segmenter 904 provides segments to gate 910 and to CDN node 912 in order that the timing and alignment of the segments is correct when received at gateway node 910.

Figure 10A:
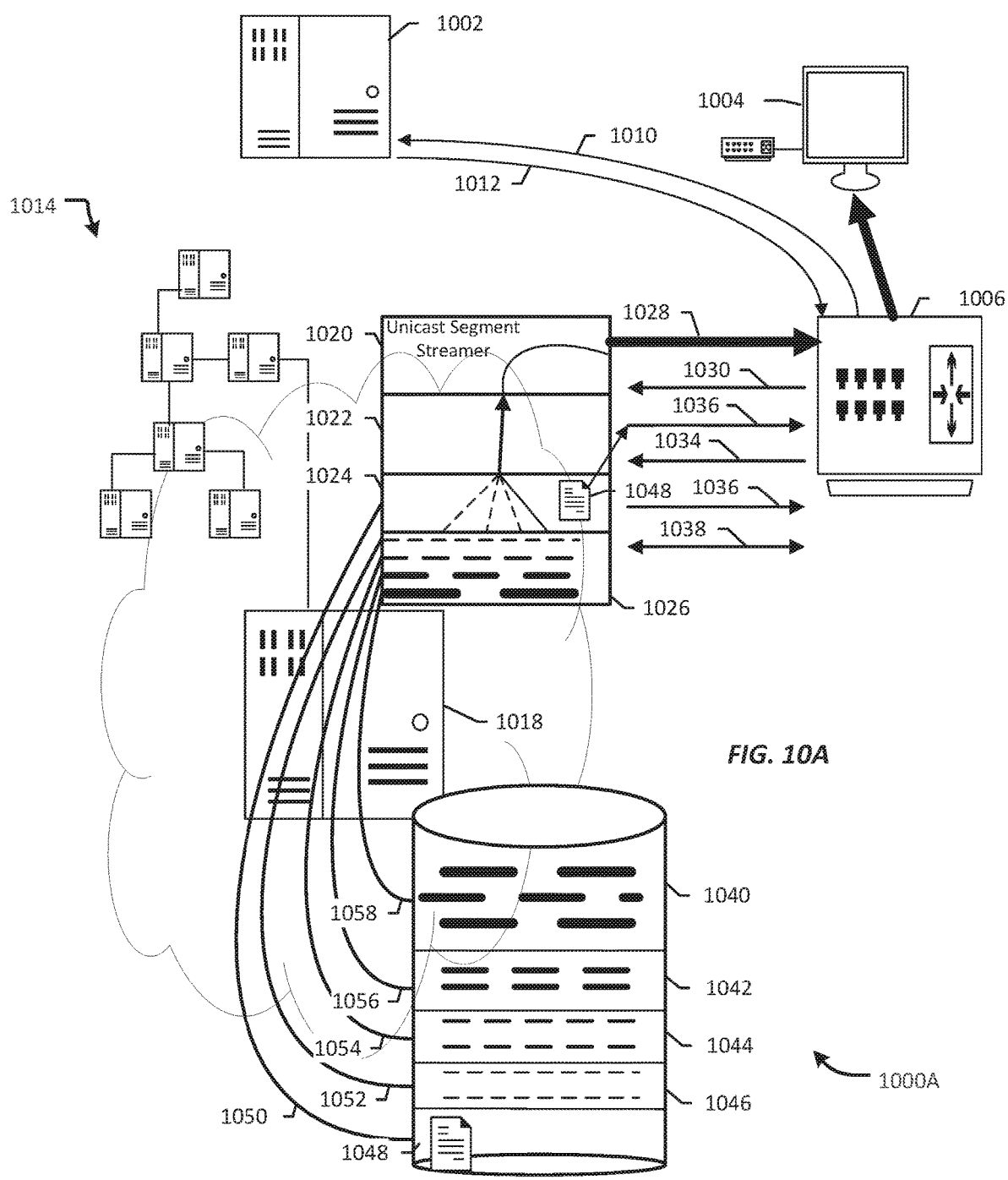
FIGS. 10A and 10B depict a network environment that provides streaming content to a client device according to an embodiment of the present patent application.
Figure 10B:
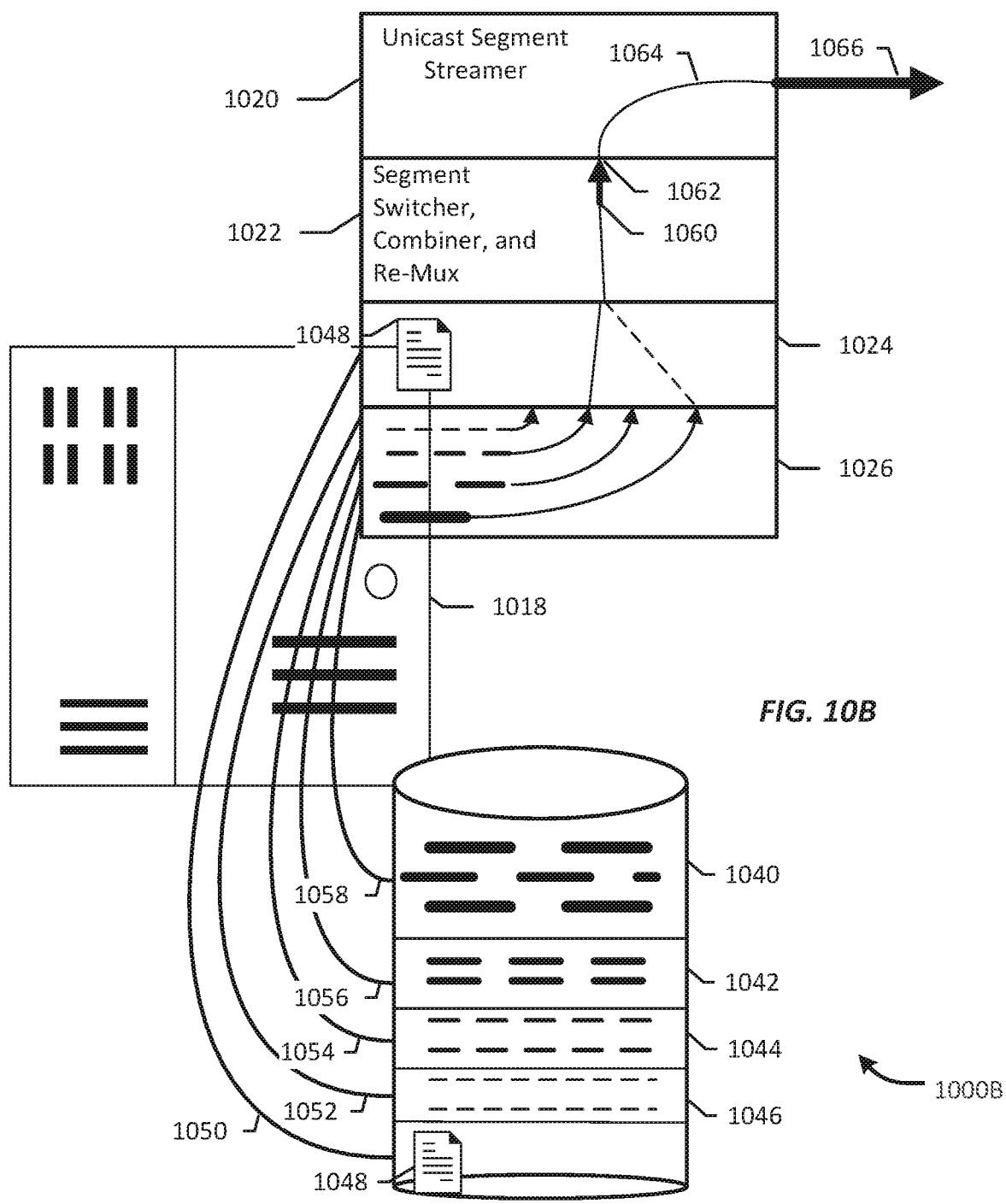
Figure 11A:
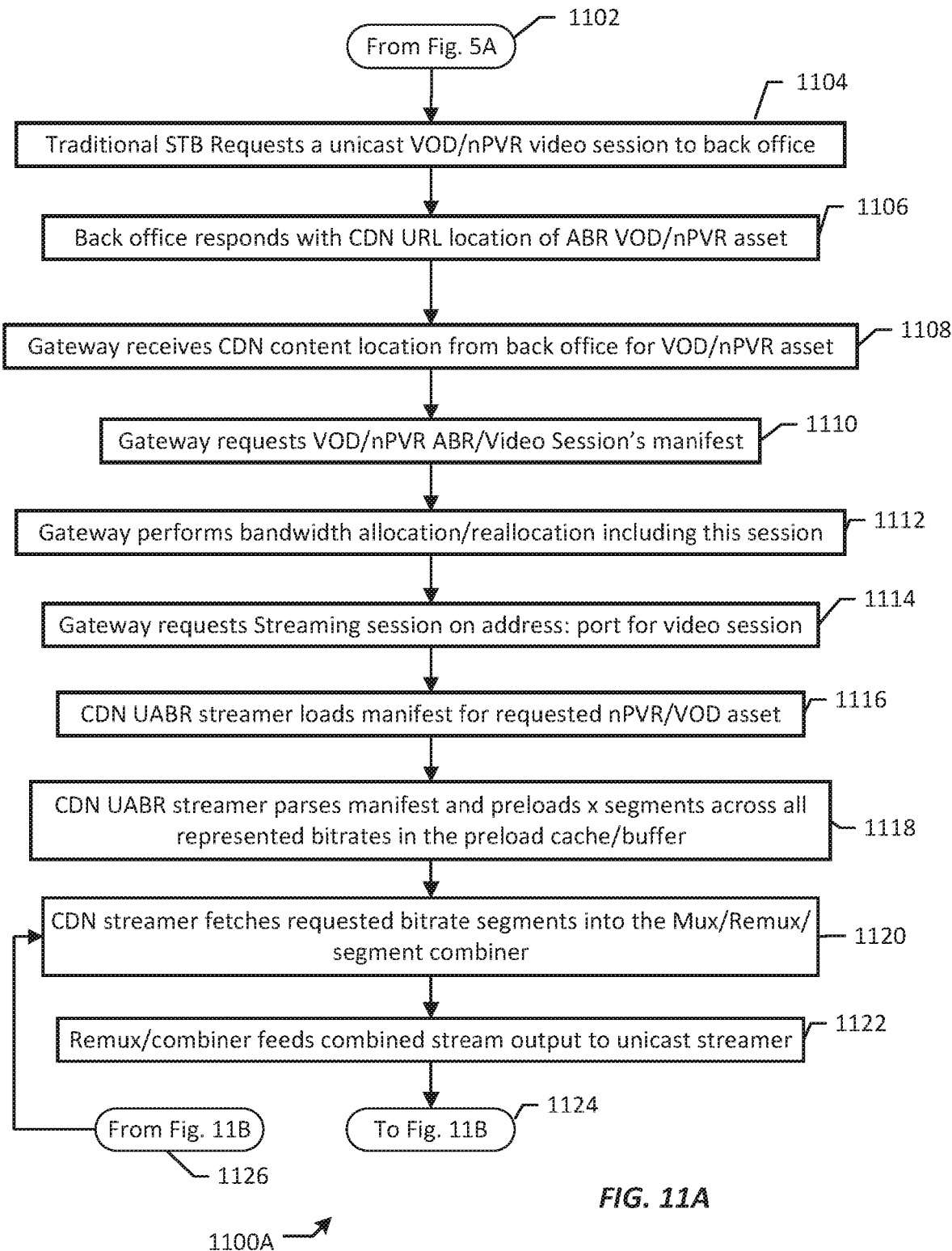
FIGS. 11A and 11B depict a flowchart of a method for delivering unicast adaptive bitrate (UABR) streaming according to an embodiment of the present patent disclosure.
Figure 11B:
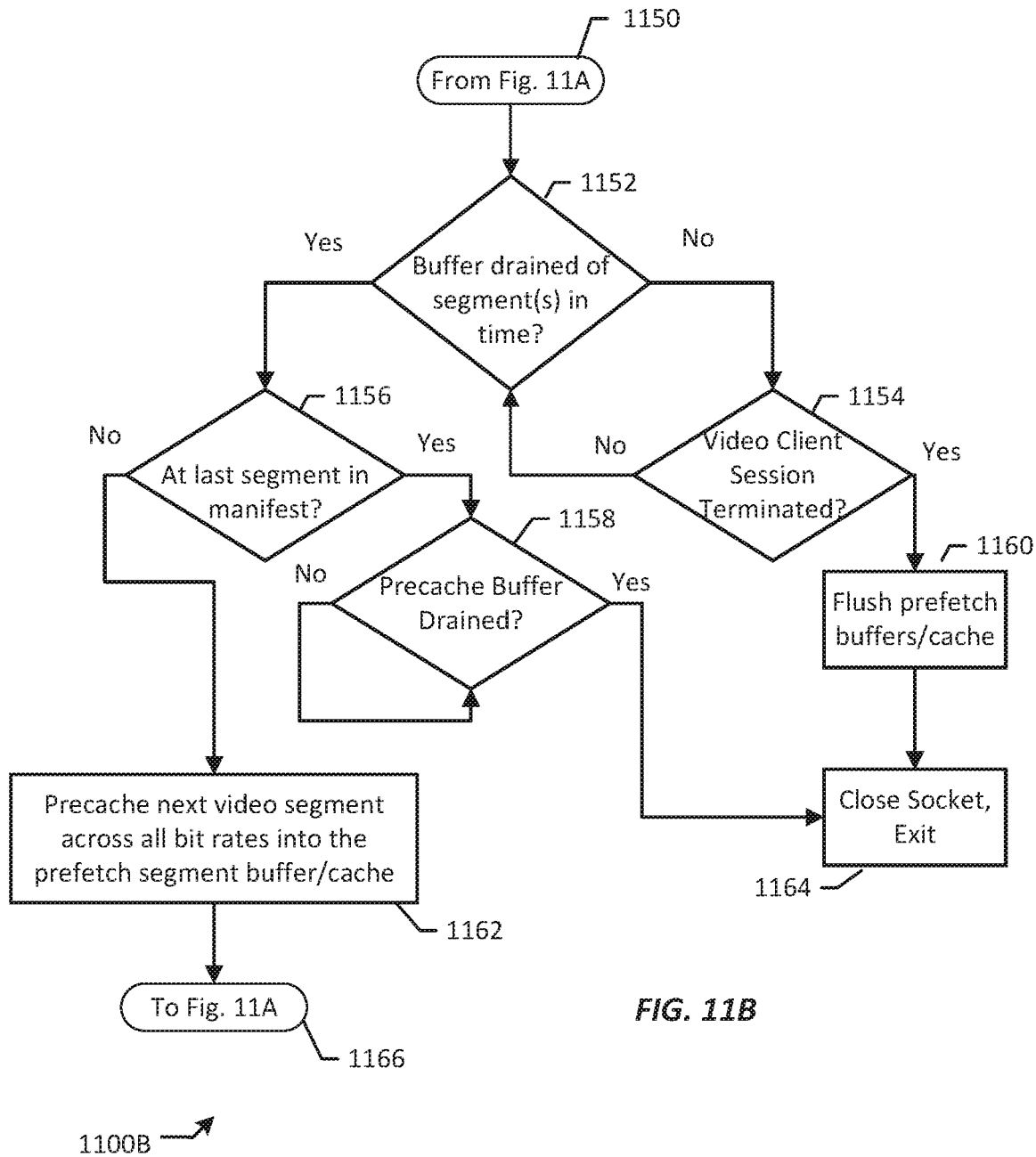

Turning now to FIGS. 10 and 11, a system and method for providing unicast ABR streaming are disclosed. In this embodiment, a traditional unicast streaming set top box requests content in a usual manner. Multiple ABR encoded bitrates of that content are sent to CDN node, which can select among the various bitrates and unicast the optimal bitrate to the traditional unicast set top box. The bitrate used can be determined either by the network, which can receive feedback about network conditions, or by a device in the home, such as a premises gateway device that tracks the capabilities of the home network and adjusts the bitrate as described in FIG. 1. The system and method will now be described in greater detail with reference to FIG. 10A and FIG. 11. System 1000A for providing unicast ABR streaming includes video assets that are encoded in an adaptive-streaming-friendly manner. In this example, a single video asset is shown and is illustrated as video segments 1040, 1042, 1044, 1046, each of which is provided at a different bitrate, and manifest 1048. The video asset is stored at content delivery network node 1018, which is part of CDN 1014. The system further comprises video back office 1002, unicast content streamer 1020, content switch 1022, 1024, premises gateway device 1006 and traditional cable/IPTV set top box 1004. The functions of these elements are described with reference to the method shown in FIG. 11, while continuing also to look at FIG. 10A. Traditional STD 1004 requests (1104) a unicast video-on-demand (VOD) or network private video recorder (nPVR) video session from back office 1002 via gateway 1006. Back office 1002 receives the request 1010 and responds (1106) with a URL 1012 to gateway device 1006 that indicates the CDN URL location of the ABR VOD/nPVR asset. Gateway device 1006 receives (1108) the CDN content location from back office 1002 and requests (1110) an asset manifest for the VOD/nPVR asset in communication 1030 from the appropriate CDN node, here node 1018. The gateway is able to determine the needs and capabilities of STB 1004 within the context of contractual agreements and other video usage in the home, as described elsewhere in the present application. On receiving the manifest via communication 1036, gateway device 1006 performs bandwidth allocation or reallocation (1112) that includes the new session and requests a streaming session (1114) at address:port for the video session at a requested bitrate, e.g., 5 Mbs, via communication 1034. CDN node 1018 acknowledges the requested session in communication 1036 and loads (1116) manifest 1048. Unicast streamer 1020 parses (1118) the manifest and preloads a number of segments across all represented bitrates in a preload cache/buffer 1026. CDN streamer 1020 fetches (1120) segments at the requested bitrate into the MUX/ReMUX/segment combiner 1022 using switch 1024. The MUX/combiner 1022 "stitches" together the segments at the designated bitrate and feeds (1122) the combined segments to streamer 1020. The unicast video is sent as stream 1028 to gateway 1006, which streams the unicast video to STB 1004.

There is an expectation that the streamer will drain the buffer within a specific amount of time, which can vary according to specific embodiment. The method determines (1152) whether the buffer 1026 is drained of segments in the specific amount of time. If not, the user may have paused or terminated the session, so a determination is made (1154) whether the session was terminated. If not (No to 1154), the method continues to check whether the buffer has been drained or the session terminated until one event or the other occurs. If the session has been terminated (Yes to 1154), the CDN node flushes (1160) the prefetch buffers or cache, closes (1164) the socket and exits. Otherwise, if the buffer was drained on segments in an appropriate time (Yes to 1152), a further determination is made whether the video is at the last segment in the manifest (1156). If the video is at the last segment (Yes to 1156), the method determines whether the precache buffer has been drained (1158). If so (Yes to 1158), the socket is closed and the method exits (1164). Otherwise, if the video is not at the last segment in the manifest (No to 1156), the CDN node will precache (1162) the next video segments across all bit rates into the prefetch segment buffer or cache and continue streaming the video by returning to step 1120.

During the unicast of the video, it may become necessary to change the bitrate at which the unicast is streamed. In the example shown in FIG. 10A, gateway device 1006 determines that the network demand at the premises has changed and the bitrate for the present unicast needs to be changed. After determining a new bitrate for the unicast, gateway device 1006 requests for a change to the bitrate. This request and the response sent by CDN node 1018 is shown as communication 1038. The switching process is shown in FIG. 10B, in which switch 1024 is moved from retrieving the highest bitrate in the prefetch cache 1026 and now retrieves from a lower bitrate representation of the video asset. Together, segment switcher 1022 and switch 1024 are responsible for ensuring that the switch is done in a timeframe that means the user will not notice a disruption in service during the switch. The disclosed system and method can allow traditional unicast streams to be provided as unicast adaptive bitrate (UABR) streaming and to adapt to dynamically changing network conditions in the video streaming pipe. No modifications to legacy set top clients are needed to add this unicast ABR streaming functionality. Neither does the disclosed system and method require traditional progressive download streaming methodologies to be applied in the STB. This allows consumers to have an increased quality of service and providers to have more robust bandwidth management tools without costly upgrades needed in the consumer's home. It also provides for the reuse of ABR progressive download encoded content to be delivered to traditional IPTV/cable STBs. One skilled in the art will understand that a number of variations in the devices and methods shown may be used and are within the scope of the disclosed embodiments.

In the foregoing Detailed Description, functionalities of the various elements including components/blocks labeled or described as "module" or "process" or "processor" or "controller" or "computer" may be provided through the use of dedicated hardware as well as hardware capable of executing stored or preconfigured software. When provided by a processor, the functions may be provided by a single dedicated processor, by a single shared processor, or by a plurality of individual processors, some of which may be shared or distributed. Moreover, a "processor" or "controller" or "memory" may include, without limitation, digital signal processor (DSP) hardware, ASIC hardware, read only memory (ROM), random access memory (RAM), and/or other storage media.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method of synchronizing multicast adaptive bitrate (MABR) delivery of a requested channel and progressive download adaptive bitrate (ABR) delivery of the requested channel from a premises gateway to user devices, the method comprising:
responsive to determining that a requested video session is for MABR content on a requested channel, the premises gateway requesting a location of a content delivery network (CDN) from a back office and requesting a video session manifest for the requested channel from the CDN;
if a client requesting the requested video session is a progressive download ABR client, delivering a copy of the video session manifest to the progressive download ABR client whereby the progressive download ABR client can begin pulling video segments;
if the client is not a progressive download ABR client and if the requested channel is not already being watched at a premises served by the premises gateway, the premises gateway receiving the video session manifest for the requested channel and joining an MABR multicast for the requested channel, wherein the video session manifest and the MABR multicast both access content from a single multicast segmenter; and
if the client is not a progressive download ABR client, delivering a combined segmented stream from the MABR multicast for the requested channel to the client.

2. The method of claim 1 further comprising:
retaining a copy of the video session manifest for the requested channel;

the premises gateway receiving a request from the progressive download ABR client to pull a requested segment and determining the requested segment using the retained copy of the video session manifest;

if the requested segment exists in a cache in the premises gateway, hijacking the request and delivering the requested segment from the cache; and if the requested segment does not exist in the cache in the premises gateway, forwarding the request to the CDN and delivering the requested segment from the requested location.

3. The method of claim 1 further comprising:

altering the video session manifest prior to sending a copy of the video session manifest to the client;

the premises gateway receiving a request from the progressive download ABR client to pull segments and delivering the segments from a requested location.

4. The method of claim 1 wherein the premises gateway joins the MABR multicast at a bitrate calculated to fit into a percentage of a premises video pipe dedicated to streaming.

5. The method of claim 4 wherein the premises gateway adjusts the flow of delivery of packets to the progressive download ABR client to cause the progressive download ABR client to change bitrates in order to fit the bandwidth delivered within a percentage of a premises video pipe dedicated to progressive download ABR clients.

6. The method of claim 1 further comprising, responsive to receiving a request for the requested video session from a client device, retrieving a device and content policy from a policy manager.

7. The method of claim 6 further comprising, if no ABR session with the gateway currently exists, retrieving ABR pipe policies from the policy manager.

* * * * *